US012650350B2

(12) United States Patent (10) Patent No.: US 12,650,350 B2
Tsuruoka et al. (45) Date of Patent: Jun. 9, 2026

(54) SHEAR FORCE SENSOR, AND DETECTION UNIT FOR SHEAR FORCE SENSOR

(71) Applicant: NISSHA CO., LTD., Kyoto (JP)

(72) Inventors: Ayuko Tsuruoka, Kyoto (JP); Yuji Watazu, Kyoto (JP)

(73) Assignee: NISSHA CO., LTD., Kyoto (JP)

( * ) Notice: Subject to any disclaimer, the term of this patent is extended or adjusted under 35 U.S.C. 154(b) by 353 days.

(21) Appl. No.: 18/571,463

(22) PCT Filed: Mar. 30, 2022

(86) PCT No.: PCT/JP2022/016313
§ 371 (c)(1),
(2) Date: Dec. 18, 2023

(87) PCT Pub. No.: WO2023/276390
PCT Pub. Date: Jan. 5, 2023

(65) Prior Publication Data
US 2024/0280422 A1 Aug. 22, 2024

(30) Foreign Application Priority Data

Jun. 29, 2021 (JP) ................................. 2021-107827

(51) Int. Cl.
*G01L 1/14* (2006.01)
*G01L 5/165* (2020.01)
*G06F 3/044* (2006.01)

(52) U.S. Cl.
CPC .............. *G01L 1/142* (2013.01); *G06F 3/044* (2013.01); *G01L 1/14* (2013.01); *G01L 1/146* (2013.01);
(Continued)

(58) Field of Classification Search
CPC ......... G01L 1/142; G01L 1/146; G01L 5/165; G01L 1/14; G06F 3/044;
(Continued)

(56) References Cited

U.S. PATENT DOCUMENTS 7,343,813 B1 3/2008 Harrington
9,864,450 B2 1/2018 Watazu et al.
(Continued)

FOREIGN PATENT DOCUMENTS

JP 5797865 B1 10/2015
JP 2019152599 A 9/2019
(Continued)

OTHER PUBLICATIONS

International Search Report PCT/EP2022/016313 dated May 10, 2022 (pp. 1-2).

*Primary Examiner* — Peter J Macchiarolo
*Assistant Examiner* — John M Royston
(74) *Attorney, Agent, or Firm* — Millen, White, Zelano & Branigan P.C.; William F. Nixon

(57) ABSTRACT

A thin and durable detection unit for a shear force sensor is disclosed. The detection unit detects shear forces in a plurality of directions. A detection circuit is connected to a first electrode layer and a second electrode layer. First driving electrodes and second driving electrodes insulated from each other by first isolation trenches are formed in the first electrode layer. The second driving electrodes also serving as third driving electrodes and the first driving electrodes also serving as fourth driving electrodes insulated from each other by second isolation trenches are formed in the first electrode layer. First detection electrodes and second detection electrodes are formed in the second electrode layer.

20 Claims, 18 Drawing Sheets

(52) U.S. Cl.
CPC ............ *G01L 5/165* (2013.01); *G06F 3/0445*
(2019.05); *G06F 3/0447* (2019.05); *G06F*
*2203/04105* (2013.01); *G06F 2203/04107*
(2013.01)

(58) Field of Classification Search
CPC . G06F 2203/04105; G06F 2203/04107; G06F
3/0447; G06F 3/0445
USPC ................................................... 73/862.626
See application file for complete search history.

(56) References Cited

U.S. PATENT DOCUMENTS

| | | | | |
|---|---|---|---|---|
| 11,860,048 B2 * | 1/2024 | Bao | .......................... | G01L 1/142 |
| 2014/0292703 A1 * | 10/2014 | Yilmaz | ................. | G06F 3/0445 |
| | | | | 345/174 |

FOREIGN PATENT DOCUMENTS

| | | | |
|---|---|---|---|
| JP | 2020173212 A | 10/2020 |
| JP | 2021076511 A | 5/2021 |
| WO | 2018012033 A1 | 1/2018 |

* cited by examiner (a)

(b)

(a)

(b)

SHEAR FORCE SENSOR, AND DETECTION UNIT FOR SHEAR FORCE SENSOR

TECHNICAL FIELD

The present invention relates to a shear force sensor, and a detection unit for the shear force sensor, and more particularly relates to a shear force sensor that detects a shear force by capacitance, and a detection unit for the shear force sensor.

BACKGROUND ART

Patent Literature 1 (Japanese Patent No. 6823100) discloses a capacitance detection device that can measure a shear force distribution. In a case of measuring a shear force distribution by using the capacitance detection device of Patent Literature 1, it is required to detect a change in capacitance caused by variation of a local distance between electrodes or variation of area.

CITATION LIST

Patent Literature

Patent Literature 1: Japanese Patent No. 6823100

SUMMARY OF INVENTION

Technical Problem

As described in Patent Literature 1, it is necessary to use a material having high flexibility between electrodes in order to detect a shear force from variation of a local distance between the electrodes or the like. Since there are few materials that can be applied as the material to be arranged between the electrodes, it is difficult to provide high durability for a device that detects a shear force.

In addition, in the capacitance detection device of Patent Literature 1, detection electrodes that detect shear forces in different directions must be formed in different layers in order to measure a shear force distribution, which raises problems in that a difference occurs between detection sensitivities in the different directions and the thickness in a laminate direction is increased.

An object of the present invention is to provide a thin and durable detection unit for a shear force sensor, the detection unit detecting shear forces in a plurality of directions.

Solution to Problem

Hereinafter, a plurality of aspects will be described as solutions to achieve the object. Any combination of these aspects may be possible as necessary.

A shear force sensor according to an aspect of the present invention includes a first electrode layer and a second electrode layer opposite to each other, an insulating elastic body layer that is located between the first electrode layer and the second electrode layer to electrically insulate both the electrode layers and is elastically deformable in a first in-plane direction of the first electrode layer, and a detection circuit connected to the first electrode layer and the second electrode layer. A first driving electrode and a second driving electrode insulated from each other by a first isolation trench are formed in the first electrode layer. A third driving electrode and a fourth driving electrode insulated from each other by a second isolation trench are formed in the first electrode layer. The first isolation trench has a first portion extending in a first direction in the first in-plane direction, and the second isolation trench has a second portion extending in a second direction in the first in-plane direction, the first direction and the second direction being directions crossing each other. A first detection electrode overlapped on the first driving electrode, the first portion of the first isolation trench, and the second driving electrode when viewed in a first normal direction perpendicular to the first in-plane direction is formed in the second electrode layer. A second detection electrode overlapped on the third driving electrode, the second portion of the second isolation trench, and the fourth driving electrode when viewed in the first normal direction is formed in the second electrode layer. The detection circuit detects a first shear force exerted in a first shear direction perpendicular to the first direction in the first in-plane direction based on a change in a first capacitance produced between the first driving electrode and the first detection electrode and a change in a second capacitance produced between the second driving electrode and the first detection electrode, and detects a second shear force exerted in a second shear direction perpendicular to the second direction in the first in-plane direction based on a change in a third capacitance produced between the third driving electrode and the second detection electrode and a change in a fourth capacitance produced between the fourth driving electrode and the second detection electrode. The shear force sensor having such a configuration can configure the detection unit that detects a shear force in the first shear direction and the second shear direction with two electrode layers of the first electrode layer and the second electrode layer that sandwich the insulating elastic body layer, so that the detection unit for the shear force sensor can be made thin. In addition, two shear forces in the first shear direction and the second shear direction can be detected in a relatively wide region of the two electrode layers of the first electrode layer and the second electrode layer, and a material having relatively small stretchability can also be used as the material of the insulating layer. Thus, a material having relatively high durability can be selected as the material of the insulating elastic body, which enables a durable shear force sensor to be provided.

In the shear force sensor described above, the second driving electrode may also serve as the third driving electrode. The shear force sensor configured in this manner can have a reduced number of driving electrodes by the second driving electrode also serving as the third driving electrode.

In addition, the shear force sensor described above may be configured such that the second driving electrode also serves as the third driving electrode and the first driving electrode also serves as the fourth driving electrode. In the shear force sensor configured in this manner, the driving electrodes can be reduced by two.

The shear force sensor described above may be configured such that the first portion is provided at a plurality of locations by changing a direction in which the first isolation trench extends a plurality of times, and the first detection electrode has a shape overlapped on the first portion at the plurality of locations when viewed in the first normal direction. In the shear force sensor configured in this manner, it is easier to increase the total length of the first portion than in a case in which the first isolation trench is linear, which enables the sensitivity of the shear force sensor to be improved easily.

In the shear force sensor described above, a plurality of sets of the first driving electrode, the first isolation trench, the second driving electrode, and the first detection electrode may be provided. In the shear force sensor in which a plurality of sets of the first driving electrode, the first isolation trench, the second driving electrode, and the first detection electrode are formed in this manner, it is easier to increase the total area of the first detection electrodes than in a case in which only one set is formed, which enables the sensitivity of the shear force sensor to be improved easily.

The shear force sensor described above may be configured such that the insulating elastic body layer is elastically deformable in the first normal direction, and the detection circuit detects a pressing force in the first normal direction based on changes in the first capacitance, the second capacitance, the third capacitance, and the fourth capacitance. The shear force sensor configured in this manner can detect not only a shear force but also a pressing force.

The shear force sensor described above may further include a first insulating layer, a first shield layer, a second insulating layer, and a second shield layer, and may be configured such that the first shield layer, the first insulating layer, the first electrode layer, the insulating elastic body layer, the second electrode layer, the second insulating layer, and the second shield layer are arranged in an order presented in the first normal direction, the first shield layer and the second shield layer are made of sheet-like conductors respectively overlapped on whole surfaces of the first electrode layer and the second electrode layer when viewed in the first normal direction, the first insulating layer insulates the first electrode layer and the first shield layer, and the second insulating layer insulates the second electrode layer and the second shield layer. The shear force sensor configured in this manner can reduce an influence caused by an electric field on the first electrode layer or the second electrode layer by virtue of the first shield layer and the second shield layer, thus reducing an influence caused by noise.

The shear force sensor described above may further include a touch sensor overlapped on the first electrode layer in the first normal direction, and the detection circuit may be configured to be capable of detecting a contact made by the touch sensor. The shear force sensor configured in this manner can recognize a contact on the shear force sensor even in a case in which a shear force cannot be detected.

The shear force sensor described above may further include a wiring part that connects the detection circuit to the first electrode layer and the second electrode layer, and the wiring part may have a flexible portion that is deformed more easily than a detection unit including the first electrode layer, the second electrode layer, and the insulating elastic body layer. The shear force sensor configured in this manner can reduce an error occurring in detection of a shear force by virtue of deformation of the flexible portion.

The shear force sensor described above may be configured such that the first electrode layer, the second electrode layer, and the insulating elastic body layer are bent, the insulating elastic body layer is elastically deformable also in a second in-plane direction different from the first in-plane direction, a fifth driving electrode and a sixth driving electrode insulated from each other by a third isolation trench extending in the second in-plane direction and spreading in the second in-plane direction are formed in the first electrode layer, the third isolation trench has a third portion extending in a third direction in the second in-plane direction, a third detection electrode overlapped on the fifth driving electrode, the third portion of the third isolation trench, and the sixth driving electrode when viewed in a second normal direction perpendicular to the second in-plane direction is formed in the second electrode layer, and the detection circuit detects a third shear force exerted in a third shear direction perpendicular to the third direction in the second in-plane direction based on a change in a fifth capacitance produced between the fifth driving electrode and the third detection electrode and a change in a sixth capacitance produced between the sixth driving electrode and the third detection electrode. The shear force sensor configured in this manner can detect the third shear force in the second in-plane direction different from the first in-plane direction in which the first shear force and the second shear force are occurring.

A detection unit for a shear force sensor according to an aspect of the present invention includes a first electrode layer and a second electrode layer opposite to each other, and an insulating elastic body layer that is located between the first electrode layer and the second electrode layer to electrically insulate both the electrode layers and is elastically deformable in a first in-plane direction of the first electrode layer. A first driving electrode and a second driving electrode insulated from each other by a first isolation trench are formed in the first electrode layer. A third driving electrode and a fourth driving electrode insulated from each other by a second isolation trench are formed in the first electrode layer. It is configured such that the first isolation trench has a first portion extending in a first direction in the first in-plane direction, and the second isolation trench has a second portion extending in a second direction in the first in-plane direction, the first direction and the second direction being directions crossing each other. Then, in the detection unit for a shear force sensor, a first detection electrode overlapped on the first driving electrode, the first portion of the first isolation trench, and the second driving electrode when viewed in a first normal direction perpendicular to the first in-plane direction is formed in the second electrode layer. A second detection electrode overlapped on the third driving electrode, the second portion of the second isolation trench, and the fourth driving electrode when viewed in the first normal direction is formed in the second electrode layer.

Advantageous Effect of Invention

According to the shear force sensor of the present invention, a thin and durable detection unit including the first electrode layer, the insulating elastic body layer, and the second electrode layer for detecting shear forces in a plurality of directions of the first shear force direction and the second shear force direction can be provided.

DESCRIPTION OF EMBODIMENTS

First Embodiment (1) Overview of Configuration of Shear Force Sensor

Figure 1:
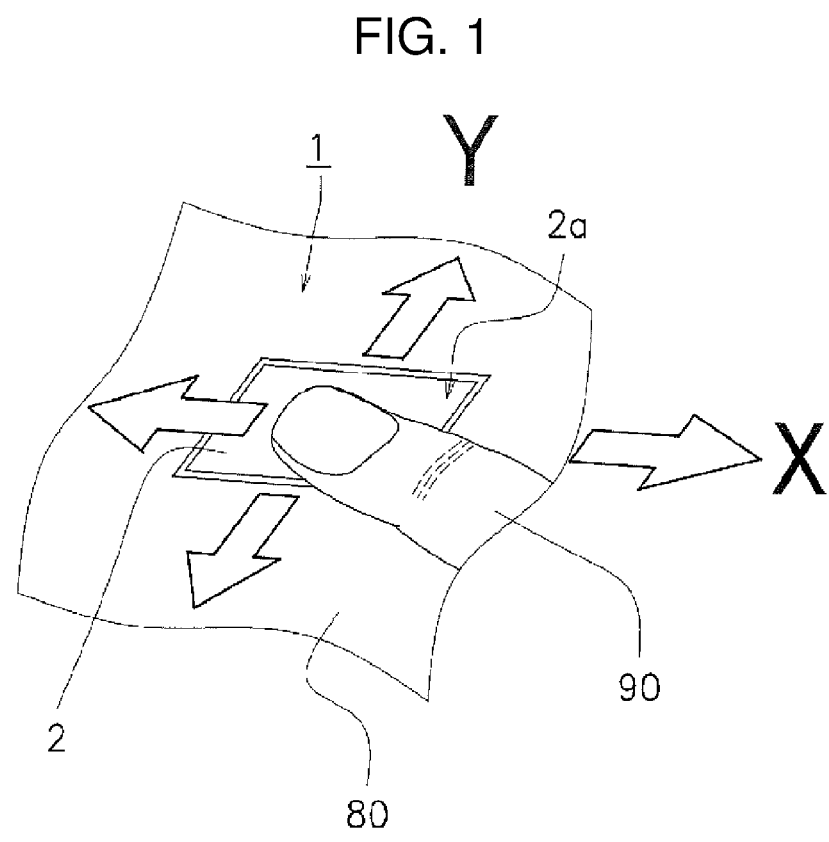
FIG. 1 is a perspective view for describing detection of shear forces in a detection unit for a shear force sensor according to a first embodiment.
Figure 2:
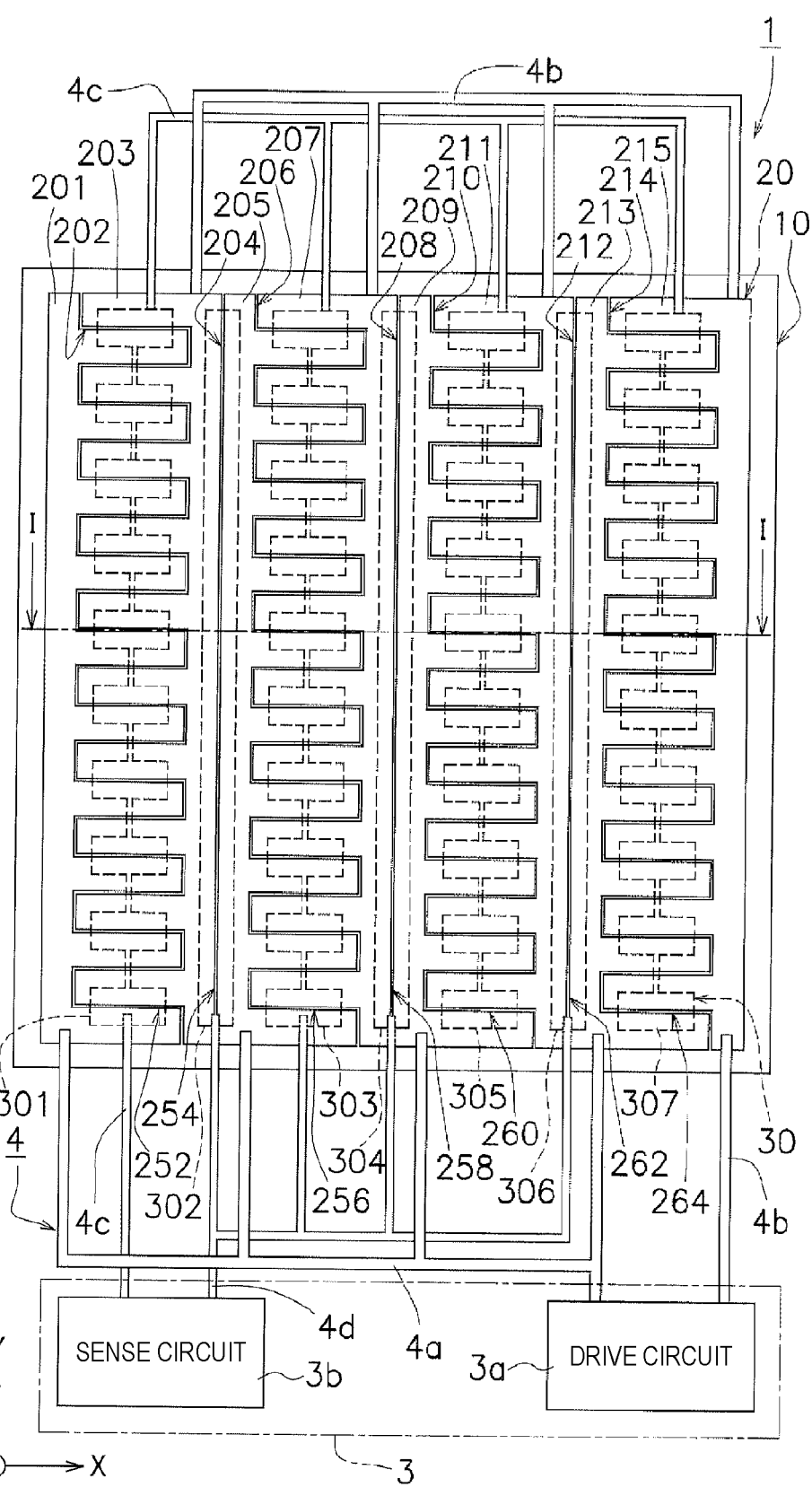
FIG. 2 is a schematic plan view showing an example of a pattern of a first electrode layer and a second electrode layer of the shear force sensor.
Figure 3:
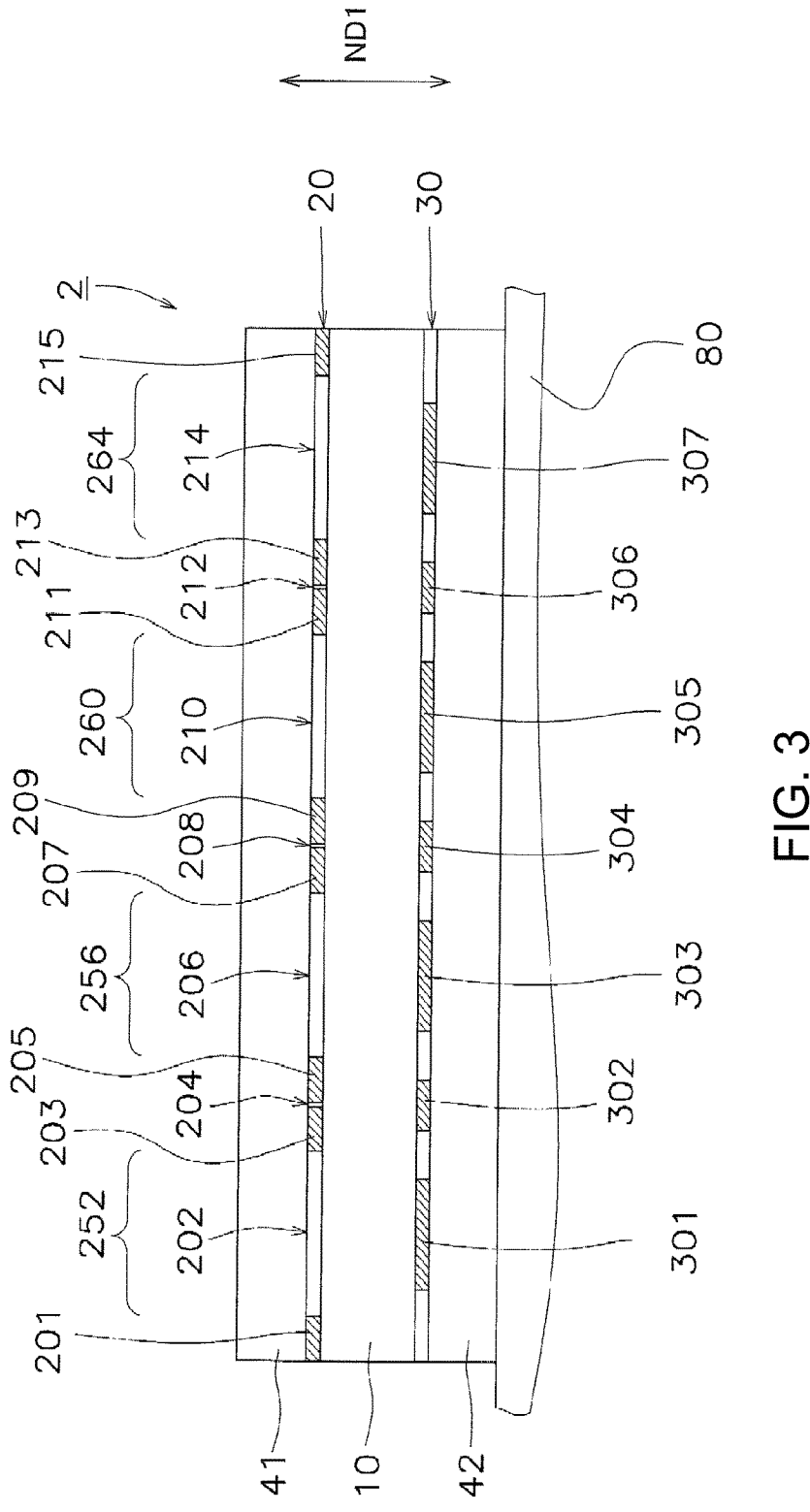
FIG. 3 is a sectional view of the detection unit cut along the line I-I in FIG. 2.

FIG. 1 shows a state in which a person is rubbing a surface 2*a* of a detection unit 2 for a shear force sensor 1 with his/her finger 90. This shear force sensor 1 is fixed to a support base 80, and detects a frictional force produced between the finger 90 and the surface 2*a*. Herein, simple detection of shear forces performed by the shear force sensor 1 is described. Such a shear force sensor 1 can be applied to a force sensor that measures a force exerted on a movable portion of an apparatus such as a robot arm, for example. The shear force sensor 1 can also be applied to an operation terminal of a user interface. The operation terminal of the user interface includes a mouse, a touch pad, and a joystick, for example. FIG. 2 shows a planar structure of a first electrode layer 20 and a second electrode layer 30 of the shear force sensor 1 as well as a detection circuit 3 connected to the first electrode layer 20 and the second electrode layer 30. FIG. 3 shows a sectional structure of the detection unit 2 when the detection unit 2 for the shear force sensor 1 is cut along the line I-I in FIG. 2.

As shown in FIG. 3, the detection unit 2 includes the first electrode layer 20 and the second electrode layer 30 as well as an insulating elastic body layer 10. The first electrode layer 20 and the second electrode layer 30 are opposite to each other. The insulating elastic body layer 10 is located between the first electrode layer 20 and the second electrode layer 30 to electrically insulate the first electrode layer 20 and the second electrode layer 30. The insulating elastic body layer 10 is provided to be elastically deformable in a first in-plane direction ID1 of the first electrode layer 20. The first in-plane direction ID1 is a direction parallel to the plane of the first electrode layer 20 indicated by arrows in FIG. 3. For example, a direction vertical to the sections of the first electrode layer 20, the insulating elastic body layer 10, and the second electrode layer 30 shown in FIG. 3 is also included in the first in-plane direction ID1. This insulating elastic body layer 10 is a layer made of an insulating elastic body having electrical insulation and elasticity.

(2) First Electrode Layer 20

The whole surface of the first electrode layer 20 is covered with a first insulating layer 41, and the whole surface of the second electrode layer 30 is covered with a second insulating layer 42. The first insulating layer 41 and the second insulating layer 42 are film base materials made of resin, for example. Herein, a case in which the second insulating layer 42 is fixed to the support base 80 and a force is exerted on the first insulating layer 41 will be described. Consequently, in this case, the surface 2*a* of the detection unit 2 in FIG. 1 is a surface of the first insulating layer 41.

As shown in FIG. 2, the detection unit 2 and the detection circuit 3 are connected with a wiring part 4.

A first driving electrode 201 and a second driving electrode 203 insulated from each other by a first isolation trench 202 are formed in the first electrode layer 20 of the detection unit 2. Similarly, a first driving electrode 205 and a second driving electrode 207 insulated from each other by a first isolation trench 206, a first driving electrode 209 and a second driving electrode 211 insulated from each other by a first isolation trench 210, and a first driving electrode 213 and a second driving electrode 215 insulated from each other by a first isolation trench 214 are formed. In this manner, the four first isolation trenches 202, 206, 210, and 214, the four first driving electrodes 201, 205, 209, and 213, and the four second driving electrodes 203, 207, 211, and 215 are formed in the first electrode layer 20. The first isolation trenches 202, 206, 210, and 214 are formed by removing conductive films constituting the first driving electrodes 201, 205, 209, and 213 and the second driving electrodes 203, 207, 211, and 215.

Three second isolation trenches 204, 208, and 212 are formed in the first electrode layer 20. The second isolation trenches 204, 208, and 212 are formed by removing the conductive films constituting the first driving electrodes 201, 205, 209, and 213 and the second driving electrodes 203, 207, 211, and 215.

A third driving electrode and a fourth driving electrode are formed on respective sides of each of the second isolation trenches 204, 208, and 212. Herein, the second driving electrodes 203, 207, and 211 also serve as the third driving electrodes, and the first driving electrodes 205, 209, and 213 also serve as the fourth driving electrodes. The third driving electrode (the second driving electrode 203) and the fourth driving electrode (the first driving electrode 205) insulated from each other by the second isolation trench 204 are formed. Similarly, the third driving electrode (the second driving electrode 207) and the fourth driving electrode (the first driving electrode 209) insulated from each other by the second isolation trench 208 as well as the third driving electrode (the second driving electrode 211) and the fourth driving electrode (the first driving electrode 213) insulated from each other by the second isolation trench 212 are formed. In this manner, the three second isolation trenches 204, 208, and 212, the three second driving electrodes 203, 207, and 211 also serving as the three third driving electrodes, and the three first driving electrodes 205, 209, and 213 also serving as the three fourth driving electrodes are formed in the first electrode layer 20.

Herein, the case in which the second driving electrodes 203, 207, and 211 also serve as the third driving electrodes in order to reduce the area of the detection unit 2 has been described, but the second driving electrodes and the third driving electrodes may be formed separately. In addition, the case in which the first driving electrodes 205, 209, and 213 also serve as the fourth driving electrodes in order to reduce the area of the detection unit 2 has been described, but the first driving electrodes and the fourth driving electrodes may be formed separately. In addition, in at least either of the case in which the second driving electrodes also serve as the third driving electrodes and the case in which the first driving electrodes also serve as the fourth driving electrodes, the number of electrodes to be subjected to driving processing can be reduced in addition to reduction of the area of the detection unit 2. By reducing the number of electrodes to be subjected to driving processing, wires to be routed can be reduced to narrow the periphery of a detection area and the width of the wiring part 4 and to reduce the number of terminals. This facilitates designing of the shear force sensor 1 and controlling of the detection circuit 3.

The first isolation trenches 202, 206, 210, and 214 respectively have first portions 252, 256, 260, and 264 extending in an X-direction (a first direction) in the first in-plane direction ID1. By changing the direction in which the first isolation trenches 202, 206, 210, and 214 extend a plurality of times, the first portions 252, 256, 260, and 264 are each provided at a plurality of locations. Herein, the first isolation trenches 202, 206, 210, and 214 are each changed in the extending direction a plurality of times to meander. Then, first detection electrodes 301, 303, 305, and 307 arranged in the plurality of first portions 252, 256, 260, and 264 respectively have shapes overlapped on the plurality of first portions 252, 256, 260, and 264 when viewed in the first normal direction ND1. In other words, portions of the first detection electrodes 301, 303, 305, and 307 overlapped on the plurality of first portions 252, 256, 260, and 264 are connected in series.

The second isolation trenches 204, 208, and 212 respectively have second portions 254, 258, and 262 extending in a Y-direction (a second direction) in the first in-plane direction ID1. The X-direction which is the first direction and the Y-direction which is the second direction are directions crossing each other, and in this case, the first direction and the second direction are direction perpendicular to each other.

Consequently, the first portions 252, 256, 260, and 264 are portions provided for detecting a shear force in the Y-direction (a first shear direction) perpendicular to the X-direction (a first direction), and the second portions 254, 258, and 262 are portions provided for detecting a shear force in the X-direction (a second shear direction) perpendicular to the Y-direction (a second direction).

Figure 6:
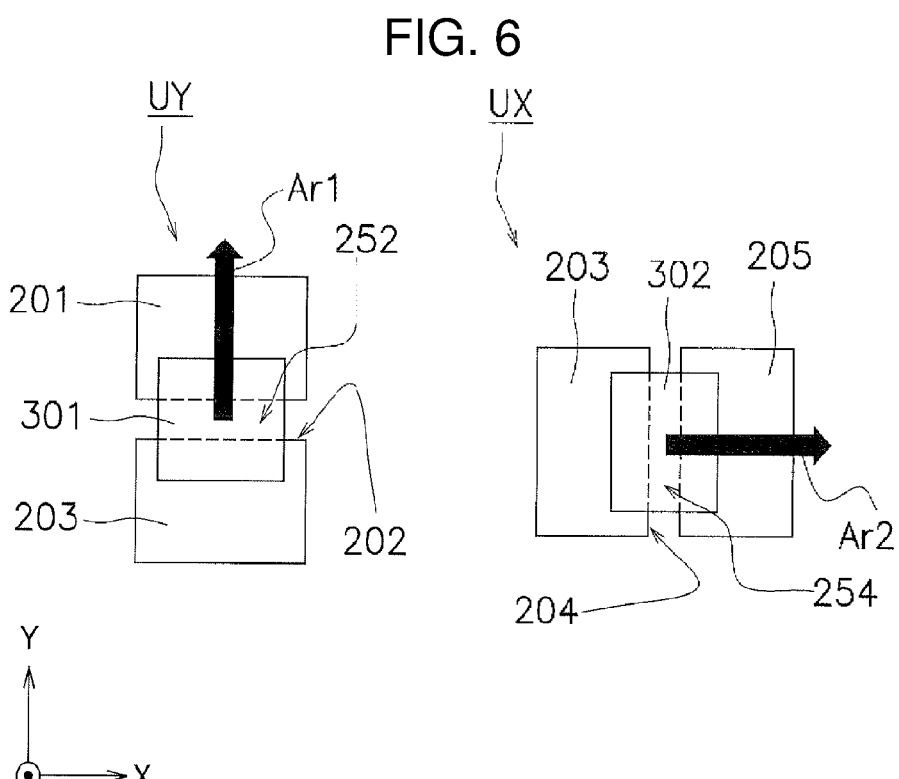
FIG. 6 is a schematic plan view for describing an X unit cell and a Y unit cell of the detection unit.

FIG. 6 shows a relation between the first portion 252 and the first shear direction (the direction indicated by an arrow Ar1). The first portion 252 is a portion of the first isolation trench 202 that extends in the X-direction (the first direction). Since the first driving electrode 201, the first portion 252, and the second driving electrode 203 are aligned in the Y-direction, a shear force in the Y-direction (the direction of the arrow Ar1) can be detected by the first detection electrode 301 overlapped on the first portion 252.

FIG. 6 also shows a relation between the second portion 254 and the second shear direction (the direction indicated by an arrow Ar2). The second portion 254 is a portion of the second isolation trench 204 that extends in the Y-direction (the second direction). Since the second driving electrode 203 also serving as the third driving electrode, the second portion 254, and the first driving electrode 205 also serving as the fourth driving electrode are aligned in the X-direction, a shear force in the X-direction (the direction of the arrow Ar2) can be detected by the second detection electrode 302 overlapped on the second portion 254.

FIG. 6 shows an example of a Y unit cell UY in which the single first portion 252 is used and an example of an X unit cell UX in which the single second portion 254 is used.

(3) Second Electrode Layer 30

The first detection electrode 301 overlapped on the first driving electrodes 201, the first portion 252 of the first isolation trench 202, and the second driving electrode 203 when viewed in the first normal direction ND1 (see FIG. 3) is formed in the second electrode layer 30. Similarly, in the second electrode layer 30, the first detection electrode 303 overlapped on the first driving electrode 205, the first portion 256 of the first isolation trench 206, and the second driving electrode 207 when viewed in the first normal direction ND1 is formed, the first detection electrode 305 overlapped on the first driving electrode 209, the first portion 260 of the first isolation trench 210, and the second driving electrode 211 is formed, and the first detection electrode 307 overlapped on the first driving electrode 213, the first portion 264 of the first isolation trench 214, and the second driving electrode 215 is formed.

The second detection electrode 302 overlapped on the third driving electrode (the second driving electrode 203), the second portion 254 of the second isolation trench 204, and the fourth driving electrode (the first driving electrode 205) when viewed in the first normal direction ND1 is formed in the second electrode layer 30. Similarly, in the second electrode layer 30, the second detection electrode 304 overlapped on the third driving electrode (the second driving electrode 207), the second portion 258 of the second isolation trench 208, and the fourth driving electrode (the first driving electrode 209) when viewed in the first normal direction ND1 is formed, and the second detection electrode 306 overlapped on the third driving electrode (the second driving electrode 211), the second portion 262 of the second isolation trench 212, and the fourth driving electrode (the first driving electrode 213) is formed.

The shear force sensor 1 shown in FIG. 2 is provided with the four sets of the first driving electrode 201, 205, 209, or 213, the first isolation trench 202, 206, 210, or 214, the second driving electrode 203, 207, 211, or 215, and the first detection electrode 301, 303, 305, or 307. Herein, the case in which the shear force sensor 1 is provided with the four sets of the first driving electrode, the first isolation trench, the second driving electrode, and the first detection electrode has been described, but in order to measure shear forces, one or more sets should only be provided, and more than four sets or less than four sets may be adopted.

The shear force sensor 1 shown in FIG. 2 is provided with the three sets of the second driving electrode 203, 207, or 211 also serving as the third driving electrode, the second isolation trench 204, 208, or 212, the first driving electrode 205, 209, or 213 also serving as the fourth driving electrode, and the second detection electrode 302, 304, or 306. Herein, the case in which the shear force sensor 1 is provided with the three sets of the third driving electrode, the second isolation trench, the fourth driving electrode, and the second detection electrode has been described, but in order to measure shear forces, one or more sets should only be provided, and more than three sets or less than three sets may be adopted.

(4) Detection Circuit 3

As shown in FIG. 2, the detection circuit 3 includes a drive circuit 3a and a sense circuit 3b. The wiring part 4 includes a first wire 4a, a second wire 4b, a third wire 4c, and a fourth wire 4d.

The drive circuit 3a is connected to the first driving electrodes 201, 205, 209, and 213 with the first wire 4a. The drive circuit 3a is also connected to the second driving electrodes 203, 207, 211, and 215 with the second wire 4b. The sense circuit 3b is connected to the first detection electrodes 301, 303, 305, and 307 with the third wire 4c. The sense circuit 3b is also connected to the second detection electrodes 302, 304, and 306 with the fourth wire 4d.

When describing shear force measurement performed by the drive circuit 3a and the sense circuit 3b, the first driving electrodes 201, 205, 209, and 213 are collectively called a first driving electrode Tx1, and the second driving electrodes 203, 207, 211, and 215 are collectively called Tx2. In addition, the first detection electrodes 301, 303, 305, and 307 are collectively called a first detection electrode Ry, and the second detection electrodes 302, 304, and 306 are collectively called a second detection electrode Rx.

When measuring shear forces, the drive circuit 3a applies an AC voltage to the first driving electrode Tx1 and the second driving electrode Tx2 at different timings. The sense circuit 3b of the detection circuit 3 measures capacitances based on electric charges detected by the first detection electrode Ry and the second detection electrode Rx, respectively, at the timing when a voltage is being applied to the first driving electrode Tx1 and at the timing when a voltage is being applied to the second driving electrode Tx2.

Figure 4:
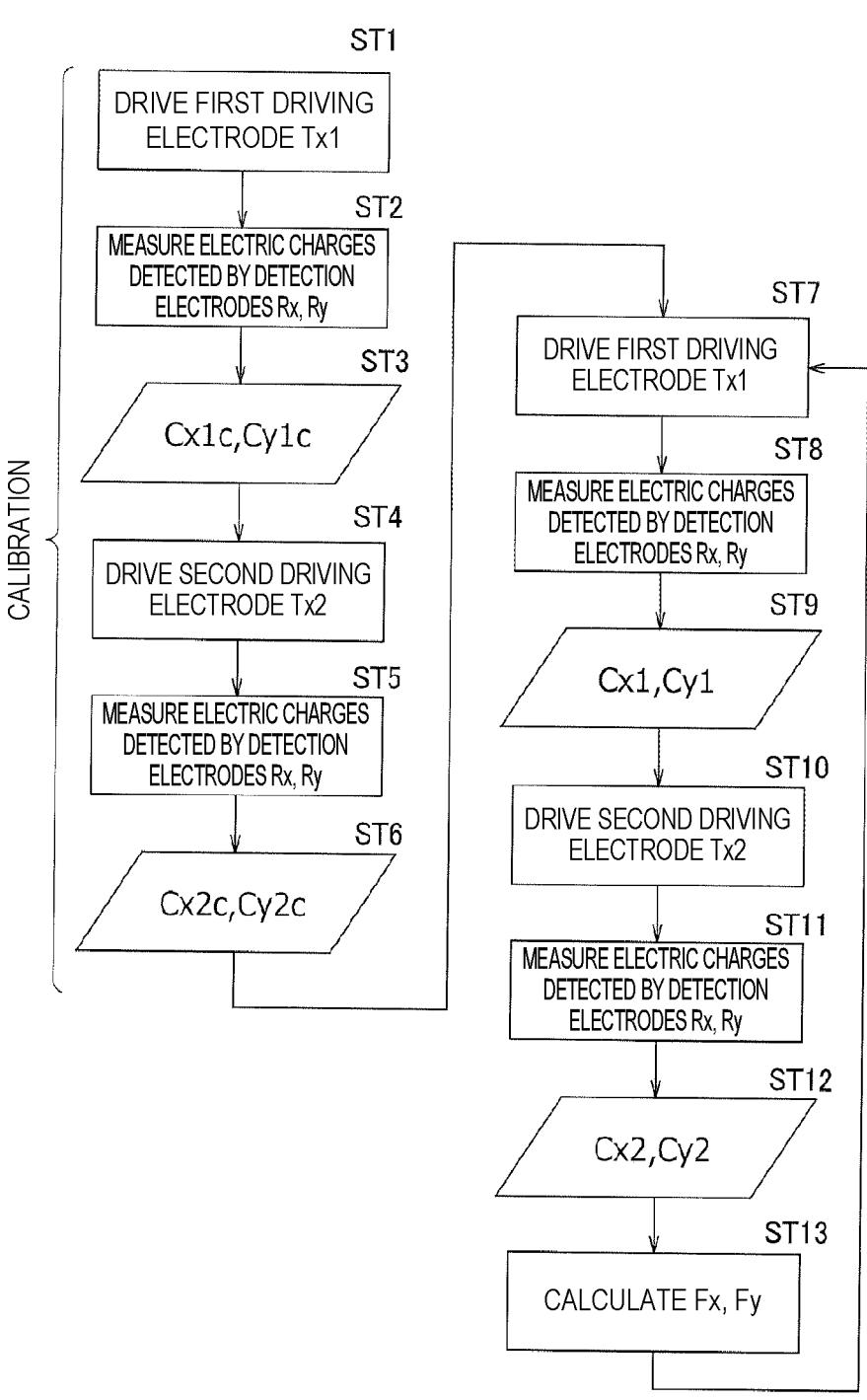
FIG. 4 is a flowchart for describing an operation of a detection circuit for the shear force sensor.
Figure 5:
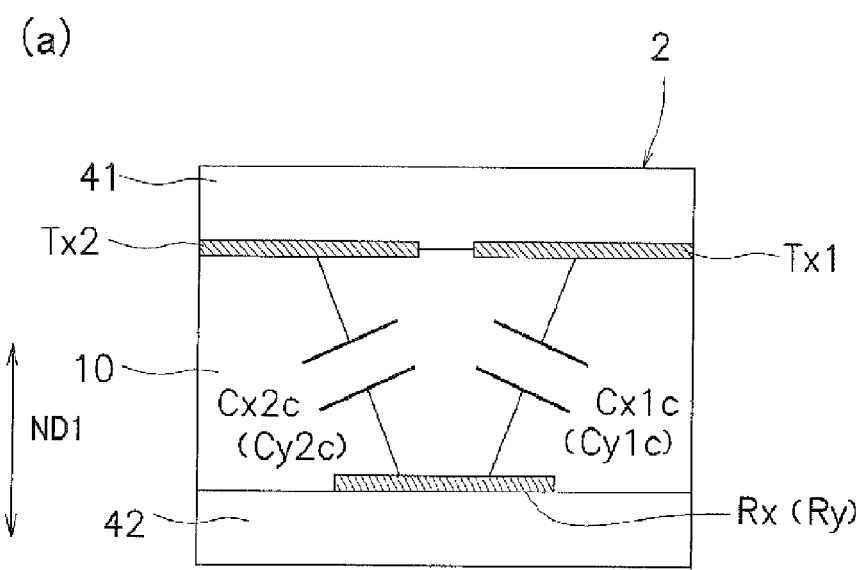
FIG. 5 includes schematic sectional views for describing capacitances in the detection unit.
Figure 5:
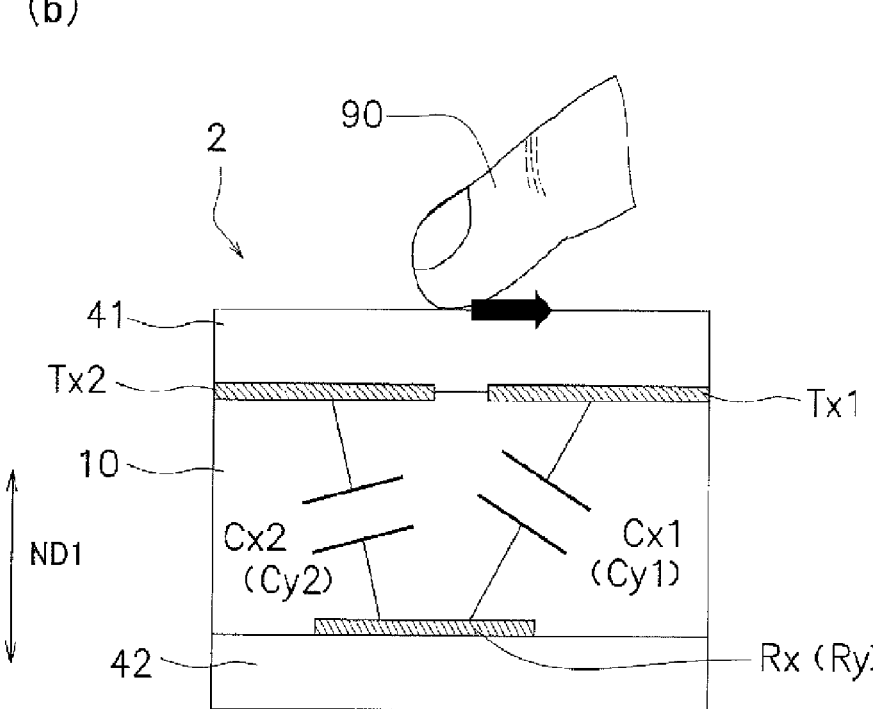

The shear force measurement performed by the detection circuit 3 will be described in line with the flowchart of FIG. 4. The detection circuit 3 measures capacitances Cx1c, Cy1c, Cx2c, and Cy2c for calibration in a state where no shear force is exerted, as shown in FIG. 5 (a).

First, the drive circuit 3a of the detection circuit 3 drives the first driving electrode Tx1 (step ST1). The sense circuit 3b of the detection circuit 3 measures an electric charge produced between the first detection electrode Ry and the first driving electrode Tx1 by driving of the first driving electrode Tx1 (step ST2). At the same time, the sense circuit 3b measures an electric charge produced between the second detection electrode Rx and the first driving electrode Tx1 by driving of the first driving electrode Tx1 (step ST2).

The detection circuit 3 calculates the capacitances Cx1c and Cy1c to be used for calibration based on the measured electric charges (step ST3).

Furthermore, the drive circuit 3a drives the second driving electrode Tx2 (step ST4). The sense circuit 3b measures an electric charge produced between the first detection electrode Ry and the second driving electrode Tx2 by driving of the second driving electrode Tx2 (step ST5). At the same time, the sense circuit 3b measures an electric charge produced between the second detection electrode Rx and the second driving electrode Tx2 by driving of the second driving electrode Tx2 (step ST5).

The detection circuit 3 calculates the capacitances Cx2c and Cy2c to be used for calibration based on the measured electric charges (step ST6).

The detection circuit 3 measures the capacitances Cx1, Cy1, Cx2, and Cy2 in a state where a shear force is exerted by the finger 90, for example, as shown in FIG. 5 (b).

The drive circuit 3a of the detection circuit 3 drives the first driving electrode Tx1 (step ST7). The sense circuit 3b measures an electric charge produced between the displaced first detection electrode Ry and the first driving electrode Tx1 by driving of the first driving electrode Tx1 (step ST8). At the same time, the sense circuit 3b measures an electric charge produced between the displaced second detection electrode Rx and the first driving electrode Tx1 by driving of the first driving electrode Tx1 (step ST8).

The detection circuit 3 calculates the changed capacitances Cx1 and Cy1 based on the measured electric charges (step ST9).

Furthermore, the drive circuit 3a drives the second driving electrode Tx2 (step ST10). The sense circuit 3b measures an electric charge produced between the displaced first detection electrode Ry and the second driving electrode Tx2 by driving of the second driving electrode Tx2 (step ST11). At the same time, the sense circuit 3b measures an electric charge produced between the displaced second detection electrode Rx and the second driving electrode Tx2 by driving of the second driving electrode Tx2 (step ST11).

The detection circuit 3 calculates the changed capacitances Cx2 and Cy2 based on the measured electric charges (step ST12).

The detection circuit 3 calculates shear forces Fx and Fy from the measured capacitances Cx1c, Cy1c, Cx2c, Cy2c, Cx1, Cy1, Cx2, and Cy2 (step ST13).

The detection circuit 3 calculates the shear force Fx in the X-direction by Equation (1) below. However, Kx is a constant.

$$Fx = Kx \cdot \{Cx1/(Cx1 + Cx2) - Cx1c/(Cx1c + Cx2c)\} \quad (1)$$

The detection circuit 3 calculates the shear force Fy in the Y-direction by Equation (2) below. However, Ky is a constant.

$$Fy = Ky \cdot \{Cy1/(Cy1 + Cy2) - Cy1c/(Cy1c + Cy2c)\} \quad (2)$$

(5) Detailed Configuration (5-1) Insulating Elastic Body Layer 10

As the material of the insulating elastic body layer 10, at least one of elastomer, resin, gel, and viscous fluid can be used, for example. Examples of elastomer include a silicone rubber, a urethane rubber, and a butadiene rubber. Examples of resin include an epoxy resin. Examples of gel include a silicone gel. As the material quality of the insulating elastic body layer 10, a silicone gel or a silicone elastomer having excellent heat resistance and cold resistance, keeping elasticity in a wide temperature range, and having excellent restorability is preferable. The thickness of the insulating elastic body layer 10 is selected as appropriate from a range of 2 μm to 5 mm, for example.

As the material of the insulating elastic body layer 10 of the first embodiment that detects a shear force in the first in-plane direction ID1 and does not detect a pressing force, a material that is hardly deformed by compression is preferable. In order to reduce deformation by compression, it is preferable to select a material having a high Poisson ratio, for example, gel. In the case of selecting gel, a pressure-sensitive surface may be widened so as to be less likely to be deformed in a pressing direction under compression, or a rigid enclosure that will not be deformed by a pressing force may be provided on the outer periphery, for example. Note that if the distance between the first driving electrode Tx1 and the first detection electrode Ry and the distance between the second driving electrode Tx2 and the first detection electrode Ry are reduced equally by compression, and if the distance between the first driving electrode Tx1 and the second detection electrode Rx and the distance between the second driving electrode Tx2 and the second detection electrode Rx are reduced equally by compression, an influence that measurement values of shear forces in the X-direction and the Y-direction receive from changes in capacitance values caused by pressing forces can be reduced.

(5-2) First Electrode Layer 20 and Second Electrode Layer 30

The materials of the first electrode layer 20 and the second electrode layer 30 have conductivity. Examples of the materials of the first electrode layer 20 and the second electrode layer 30 include a metal film, a conductive ceramic film, a conductive paste film, and a conductive polymer film. Examples of the metal film include films of gold, silver, copper, nickel, aluminum, titanium, and palladium. Examples of the conductive ceramic film include films of indium tin oxide and zinc oxide. The conductive paste film includes one obtained by dispersing metal particles in a resin binder. The conductive polymer film includes films of poly-hexylthiophene, polydioctylfluorene, pentacene, and tetra-benzoporphyrin. In order to form the first driving electrodes 201, 205, 209, and 213, the second driving electrodes 203, 207, 211, and 215, the first detection electrodes 301, 303, 305, and 307, and the second detection electrodes 302, 304, and 306 in the first electrode layer 20 and the second electrode layer 30, there is a method for forming a conductive film on the whole layer and then patterning the conductive film through etching, for example. In order to form the conductive film on the whole layer, bonding of a rolled conductive film, plating, sputtering, vapor deposition, or ion plating can be used, for example. In addition, in the case of the conductive paste film, a method for directly forming a pattern by a method such as a printing method such as screen, gravure, or offset can be used. The thicknesses of the first electrode layer 20 and the second electrode layer 30 are selected as appropriate from a range of 0.1 μm to 5 mm, for example.

Figure 7:
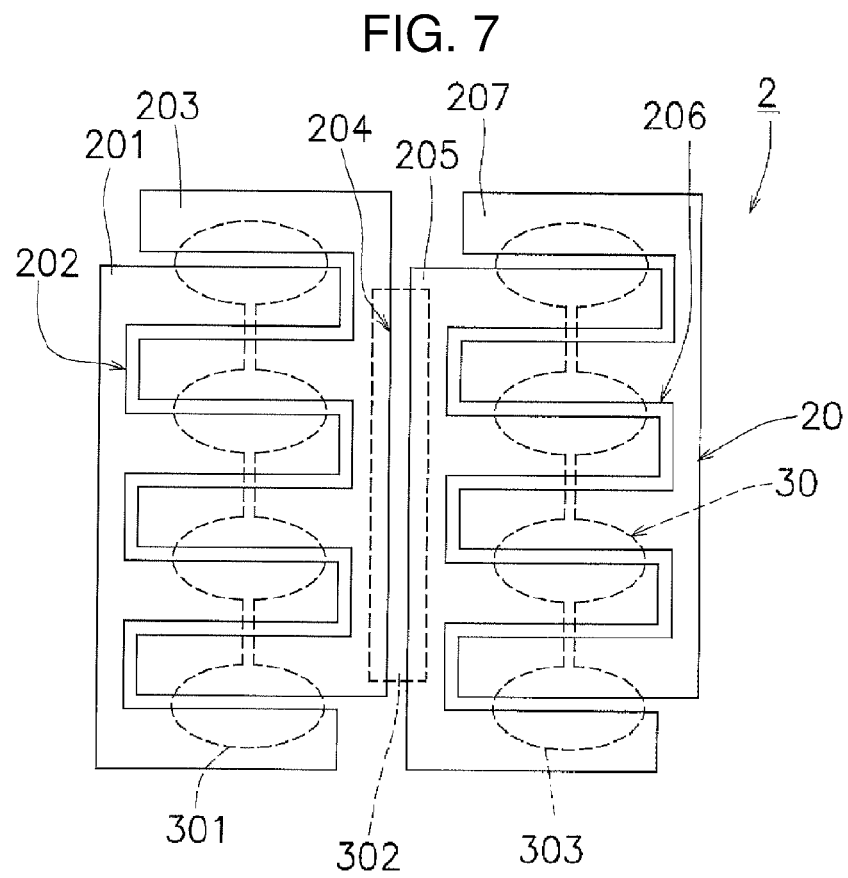
FIG. 7 is a schematic plan view showing an example of another pattern of the first electrode layer and the second electrode layer.
Figure 8:
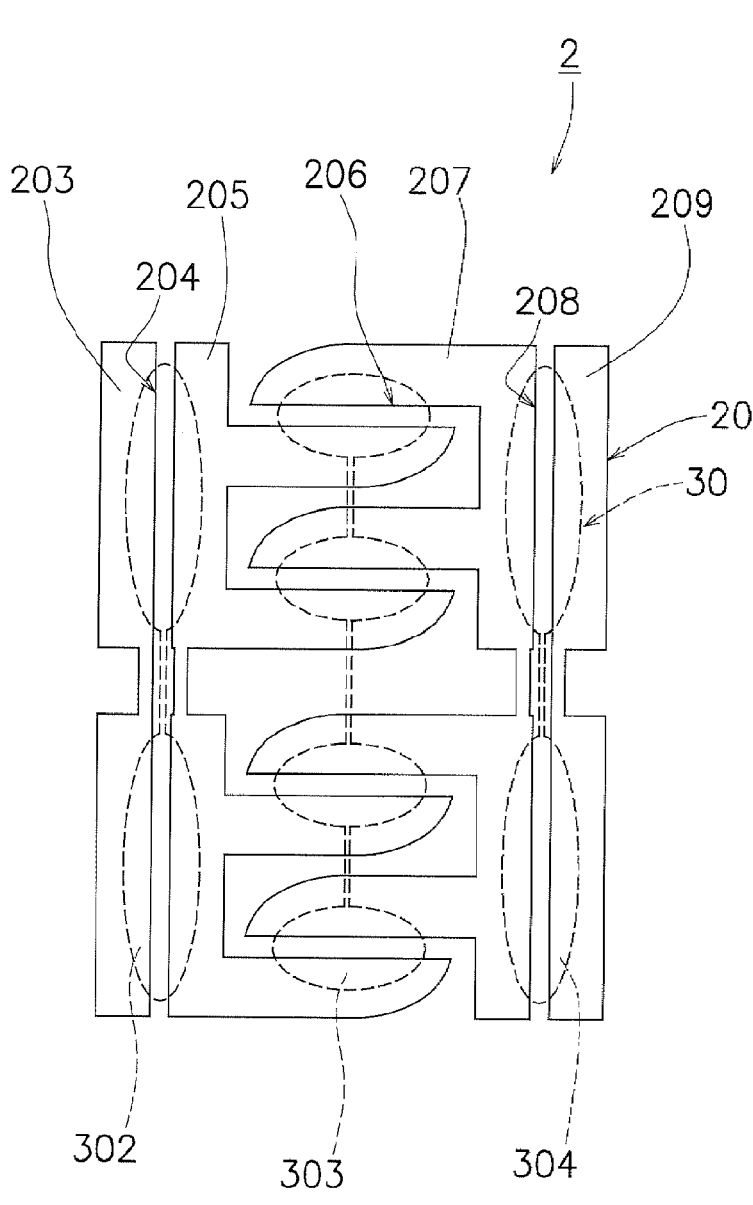
FIG. 8 is a schematic plan view showing an example of another pattern of the first electrode layer and the second electrode layer.

The shapes of the first driving electrodes 201, 205, 209, and 213, the second driving electrodes 203, 207, 211, and 215, the first detection electrodes 301, 303, 305, and 307, and the second detection electrodes 302, 304, and 306 are not limited to shapes obtained by combining rectangles as shown in FIG. 7 and FIG. 8, for example. In addition, these shapes may not be repetitions of the same pattern. Note that the first driving electrodes and the second driving electrodes of the first electrode layer 20 of the detection unit 2 and the first detection electrodes and the second detection electrodes of the second electrode layer 30 shown in FIG. 7 and FIG. 8 correspond to a partial pattern of the first electrode layer 20 and the second electrode layer 30 of the detection unit 2 in FIG. 2.

Figure 9:
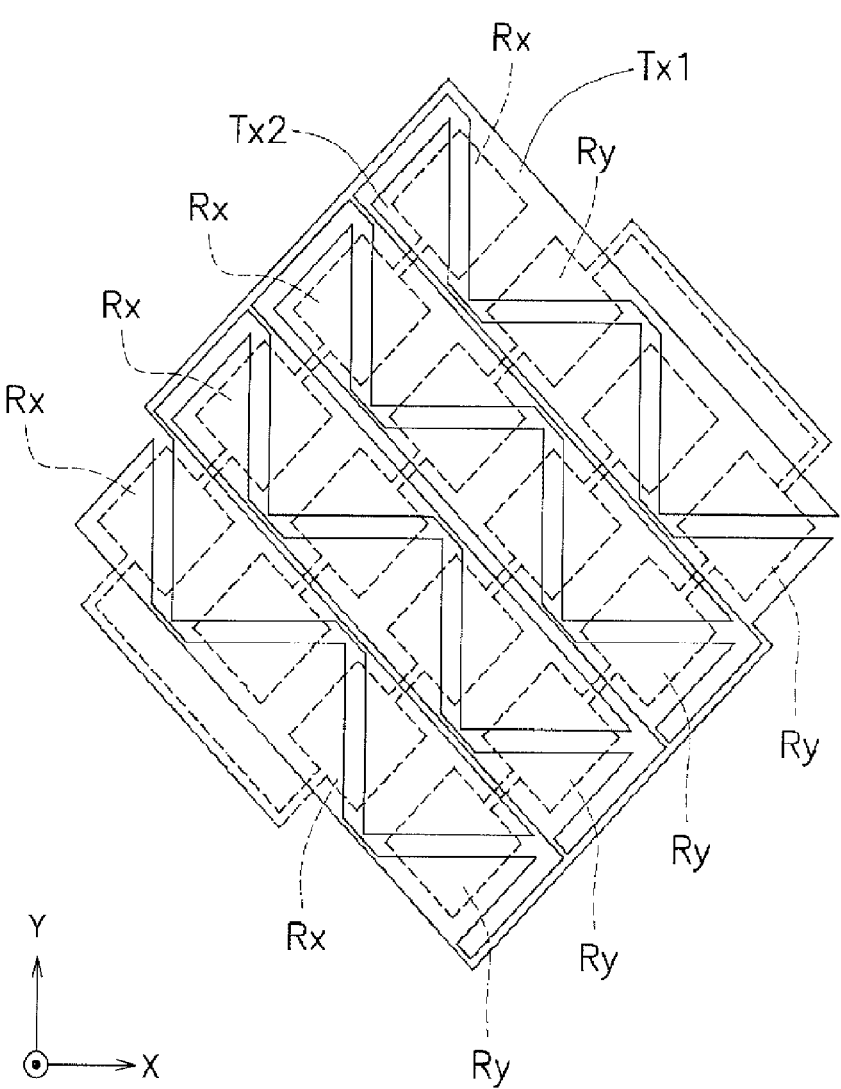
FIG. 9 is a schematic plan view showing an example of another pattern of the first electrode layer and the second electrode layer.

In addition, the first detection electrode Ry and the second detection electrode Rx may not be arranged to extend in the X-direction and the Y-direction. As shown in FIG. 9, for example, the first detection electrode Ry and the second detection electrode Rx may be arranged to extend with an inclination of 45 degrees with respect to the X-direction and the Y-direction. Furthermore, the first detection electrode Ry and the second detection electrode Rx may not be arranged regularly, but may be arranged at random, for example.

Figure 10:
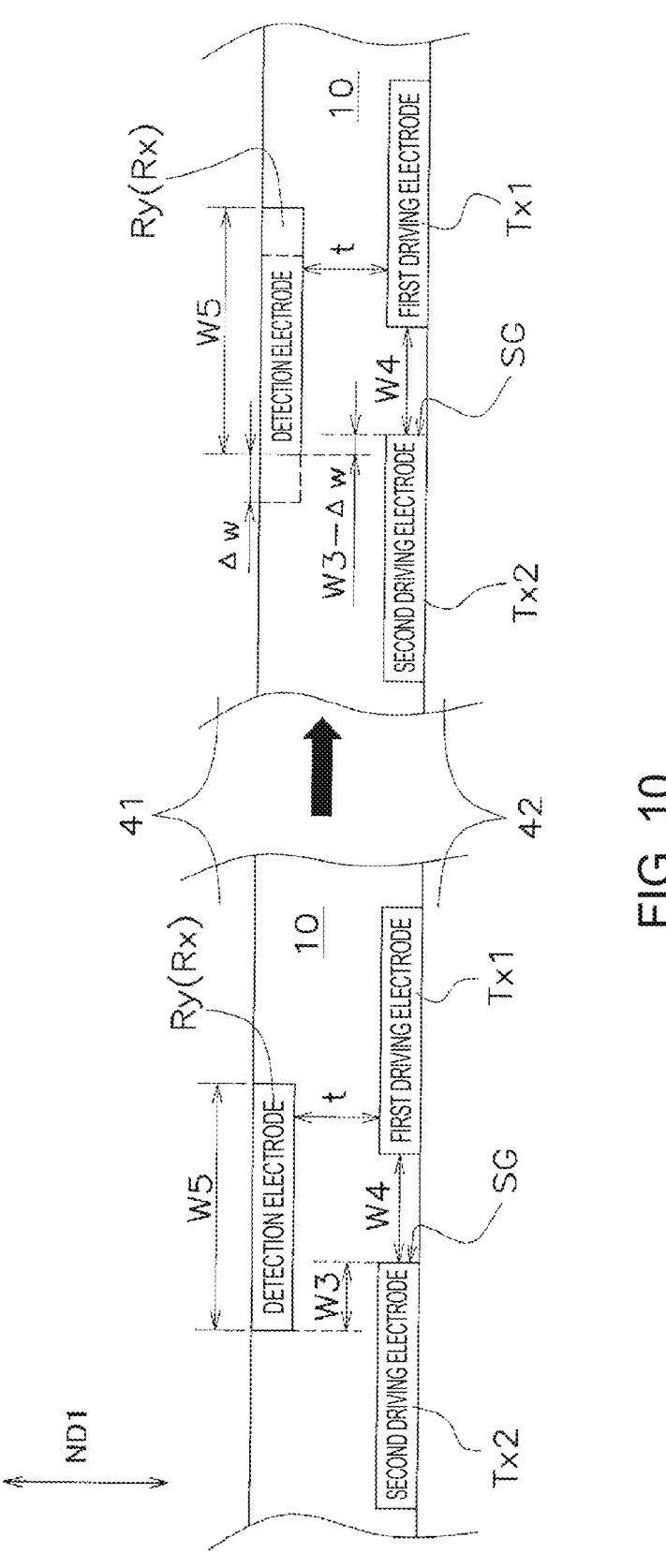
FIG. 10 is a schematic sectional view for describing a method for determining the width of an isolation trench.

As shown in FIG. 10, in order to detect shear forces, it is required that it should be possible to detect capacitance values between the first detection electrode Ry and both the first driving electrode Tx1 and the second driving electrode Tx2 when the shear forces are applied. That is to say, it is required that even after an upper electrode (the first detection electrode Ry or the first driving electrode Tx1 and the second driving electrode Tx2) on which a force is exerted is moved, an overlap width W3 between the first detection electrode Ry and both the first driving electrode Tx1 and the second driving electrode Tx2 should not be negative. Note that the same can be considered for the second detection electrode Rx similarly to the first detection electrode Ry.

When assuming that the width of the first detection electrode Ry is W5, the width of an isolation trench SG is W4, the overlap width between the first detection electrode Ry and both the first driving electrode Tx1 and the second driving electrode Tx2 is W3, and the maximum movement amount is $\Delta w$, a relation in which $W3-\Delta w>0$ needs to be satisfied. To indicate the previous expression as transformed, a relation in which $(W5-W4)/2-\Delta w>0$ needs to be satisfied.

Furthermore, $\Delta w$ depends on a thickness t of the insulating elastic body layer 10. When $\Delta w>t$ holds, a great shear stress is exerted on the insulating elastic body layer 10, which increases a risk that the insulating elastic body layer 10 is broken or delamination occurs between the insulating elastic body layer 10 and the first insulating layer 41 or the second insulating layer 42. Consequently, it is preferable that $t>\Delta w$ should hold. That is to say, it is preferable that the width W4 of the isolation trench SG should satisfy a relation in which $(W5-W4)/2-t>0$.

(5-3) First Insulating Layer 41 and Second Insulating Layer 42

Examples of the materials of the first insulating layer 41 and the second insulating layer 42 include a thermoplastic resin sheet, a thermosetting resin sheet, or a UV curable resin sheet. Examples of the material qualities of the thermoplastic resin sheet and the thermosetting resin sheet include an acrylic resin, a urethane resin, a fluoropolymer, a polyester resin, a polycarbonate resin, a polyacetal resin, a polyamide resin, and olefin. In addition, the material quality of the UV curable resin sheet includes cyanoacrylate.

(5-4) Wiring Part 4

The wiring part 4 mainly includes a flexible portion 5 in which the first wire 4a connected to the first driving electrode Tx1 of the detection unit 2, the second wire 4b connected to the second driving electrode Tx2, the third wire 4c connected to the first detection electrode Ry, and the fourth wire 4d connected to the second detection electrode Rx are arranged, and a terminal portion 6. The shear force sensor 1 can detect a shear force when the insulating elastic body layer 10 is deformed by a stress. Consequently, a shear force exerted on the detection unit 2 propagates through the flexible portion 5 to reach the terminal portion 6. When a shear force is exerted on the detection unit 2, an excessive stress is exerted on the terminal portion 6 in a case in which the terminal portion 6 and the detection unit 2 are connected in a large area, which increases a risk that the terminal portion 6 is detached or disconnected. In addition, deformation of the insulating elastic body layer 10, in other words, displacement of the first electrode layer 20 or the second electrode layer 30 will be restricted under restraint by the flexible portion 5 extending from the fixed terminal portion 6. In order to relieve the aforementioned failures, the flexible portion 5 is configured to be deformed more easily than the detection unit 2 including the first electrode layer 20, the second electrode layer 30, and the insulating elastic body layer 10.

Figure 11:
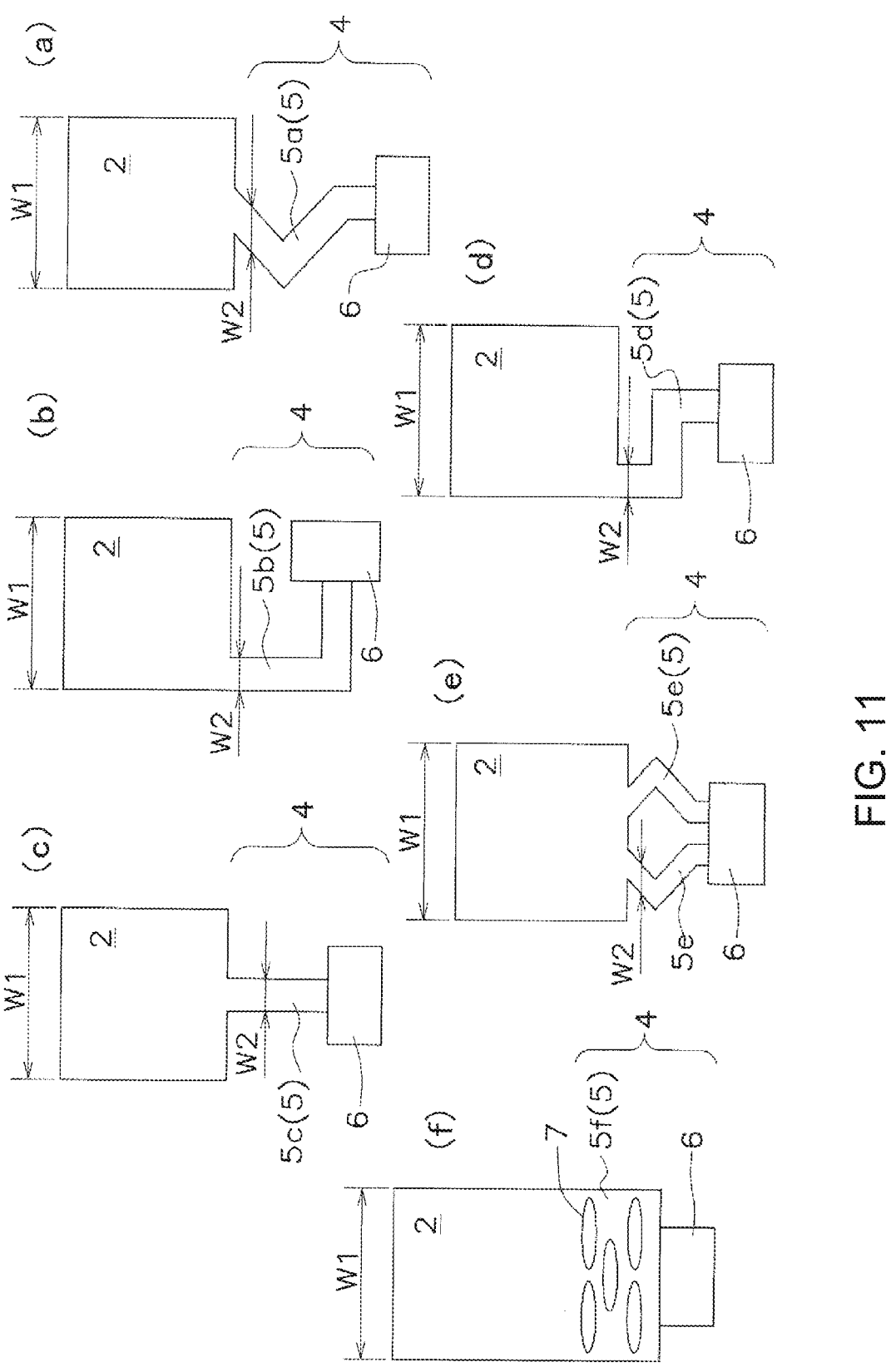
FIG. 11 includes schematic plan views for describing planar shapes of a wiring part.

FIG. 11 (*a*) to FIG. 11 (*f*) show planar shapes of the wiring part 4 having six types of different flexible portions 5*a* to 5*f*. It is preferable that the wiring part 4 should be formed into any of the shapes in FIG. 11 (*a*) to FIG. 11 (*f*).

The flexible portion 5*a* shown in FIG. 11 (*a*) has a width W2 narrower than the width W1 of the detection unit 2 and is formed into a wedge shape or C-shape, thereby being equipped with flexibility. It is preferable that the width W2 should be smaller than or equal to one-fifth of the width W1. The same applies to the following description of FIG. 11 (*b*) to FIG. 11 (*e*). It is preferable that the width W2 should be less than or equal to 3 mm, for example.

The flexible portion 5*b* shown in FIG. 11 (*b*) has the width W2 narrower than the width W1 of the detection unit 2 and is formed into an L-shape, thereby being equipped with flexibility.

The flexible portion 5*c* shown in FIG. 11 (*c*) has the width W2 narrower than the width W1 of the detection unit 2 and is formed into an I-shape, thereby being equipped with flexibility.

The flexible portion 5*d* shown in FIG. 11 (*d*) has the width W2 narrower than the width W1 of the detection unit 2 and is formed into a Z-shape, thereby being equipped with flexibility.

The flexible portion 5*e* shown in FIG. 11 (*e*) has the width W2 narrower than the width W1 of the detection unit 2 and is formed into a shape of two wedges, thereby being equipped with flexibility. As shown in FIG. 11 (*e*), a plurality of the flexible portions 5*e* may be provided.

In addition, the flexible portion 5*f* shown in FIG. 11 (*f*) has the same width as the width W1 of the detection unit 2, but is equipped with flexibility by forming a plurality of slits 7. In other words, the flexible portion 5*f* is formed into a net shape.

Note that a shape other than the shapes in FIG. 11 (*a*) to FIG. 11 (*f*), such as a bellows structure or a ring shape, may be adopted.

Figure 12:
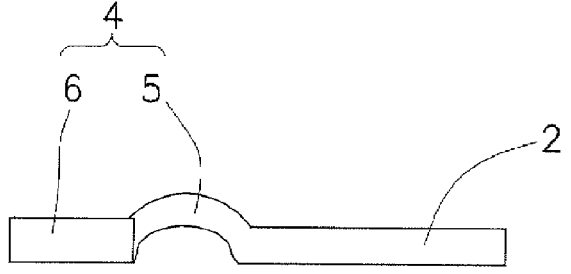
FIG. 12 is a schematic sectional view showing an example of a sectional shape of the wiring part.

In addition, it is preferable that the flexible portion 5 should have a structure bent in the first normal direction ND1 as shown in FIG. 12. Although FIG. 12 shows a case in which the flexible portion 5 has an arch shape when viewed in section, the sectional shape in which the flexible portion 5 is bent is not limited to the arch shape. The sectional shape in which the flexible portion 5 is bent in the first normal direction ND1 may be a bellows shape, for example.

Two surfaces of the flexible portion 5 spreading in the first in-plane direction ID1 may not have an identical planar shape. For example, one of the surfaces of the flexible portion 5 that is linked to a surface of the detection unit 2 (a surface on the side to be displaced by a shear stress) on the unfixed side may be made smaller than the other surface of the flexible portion 5 that is linked to a surface of the detection unit 2 on the side fixed to the support base 80 or the like. In addition, a bent structure may be applied only to the surface of the flexible portion 5 on the unfixed side, or a structure in which the two surfaces of the flexible portion 5 are not constrained by each other may be adopted.

When the flexible portion 5 is bent in the first normal direction ND1 and mounted, a stress is exerted by the thickness of the insulating elastic body layer 10 between the first electrode layer 20 and the second electrode layer 30, which increases the risk of disconnection in the first electrode layer 20 and the second electrode layer 30. In order to reduce such a risk of disconnection, the flexible portion 5 having a sectional structure shown in FIG. 13 (*a*) and FIG. 13 (*b*) may be employed. In the sectional structure shown in FIG. 13 (*a*) and FIG. 13 (*b*), the insulating elastic body layer 10 has been removed from a bent portion Pa1 which is a portion on which a stress concentrates in the flexible portion 5. Since the insulating elastic body layer 10 is not present in the bent portion Pa1, the stress exerted to the first electrode layer 20 and the second electrode layer 30 in the bent portion Pa1 is reduced. The bent portion Pa1 from which the insulating elastic body layer 10 has been removed may be filled with an insulator that produces a stress smaller than a stress produced by the insulating elastic body and can insulate the first electrode layer 20 and the second electrode layer 30.

Second Embodiment (6) Configuration of Shear Force Sensor 1 of Second Embodiment The shear force sensor 1 of the first embodiment is a sensor that measures shear forces in the X-direction and the Y-direction, in other words, shear forces in the first in-plane direction ID1. However, the shear force sensor 1 may be configured to measure a pressing force in the first normal direction ND1 in addition to the first in-plane direction ID1.

Components other than the detection circuit 3 among the components of the shear force sensor 1 of the second embodiment may be configured in the same manner as the components of the shear force sensor 1 of the first embodiment. The shear force sensor 1 of the second embodiment calculates a pressing force PFz from the measured capacitances Cx1*c*, Cy1*c*, Cx2*c*, Cy2*c*, Cx1, Cy1, Cx2, and Cy2 in step ST13 shown in FIG. 4.

The detection circuit 3 calculates the pressing force PFz in the Z-direction by Equation (3) below. However, PKz is a constant.

$$PFz = \tag{3}$$
$$PKz \cdot \{(Cx1 + Cx2 + Cy1 + Cy2)/(Cx1c + Cx2c + Cy1x + Cy2c) - 1\}$$

In the shear force sensor 1 of the second embodiment, it is preferable that a material to be deformed more significantly by compression than the material of the insulating elastic body layer 10 of the shear force sensor 1 of the first embodiment should be used for the insulating elastic body layer 10 in order to detect the pressing force PFz. Examples of the material to be used for the insulating elastic body layer 10 of the shear force sensor 1 of the second embodiment and to be deformed significantly by compression include a foam and gel. Examples of the foam include one molded in a foamed manner or a porous shape by finely dispersing gas in resin. Examples of the material quality of the foam include silicone, urethane, polyethylene, and polystyrene. The thickness of the insulating elastic body layer 10 of the second embodiment is selected as appropriate from the range of 2 μm to 5 mm, for example.

Conductive particles may be added to the insulating elastic body layer 10 in a ratio within a range that enables insulation to be maintained. Examples of the material quality of the conductive particles include carbon black, gold, silver, and nickel. When pressed, the distance between the contained conductive particles is narrowed to abruptly rise capacitance value between the first electrode layer 20 and the second electrode layer 30, thus achieving an effect of improving the sensitivity. It is preferable that the conductive particles should have an average particle size of less than or equal to one-tenth of the thickness of the insulating elastic body layer 10.

Third Embodiment

(7) Configuration of Shear Force Sensor 1 of Third Embodiment

Figure 14:
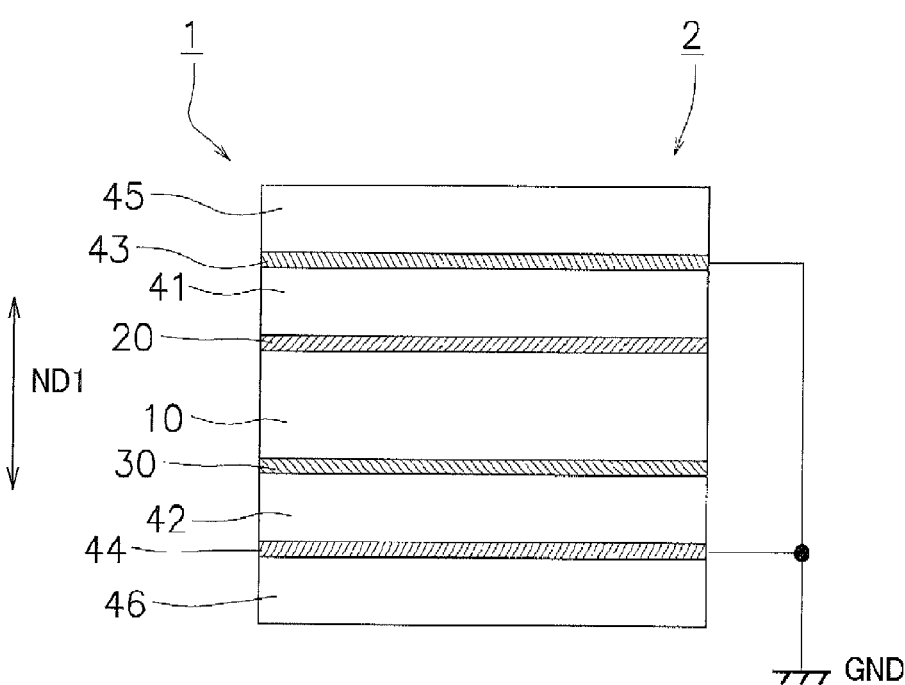
FIG. 14 is a schematic sectional view for describing a detection unit according to a third embodiment.

The detection unit 2 of a third embodiment is provided with a first shield layer 43 and a second shield layer 44 as shown in FIG. 14. The first shield layer 43 and the second shield layer 44 are connected to a ground GND, for example. Noise reduction is achieved in the shear force sensor 1 of the third embodiment by virtue of the first shield layer 43 and the second shield layer 44. The detection unit 2 of the third embodiment is also provided with a third insulating layer 45 for protecting the first shield layer 43 and a fourth insulating layer 46 for protecting the second shield layer 44. The components of the detection unit 2 other than the first shield layer 43, the third insulating layer 45, the second shield layer 44, and the fourth insulating layer 46 of the detection unit 2 of the third embodiment can be configured similarly to the components of the detection unit 2 of the first embodiment or the second embodiment. Hereinafter, the third insulating layer 45, the first shield layer 43, the second shield layer 44, and the fourth insulating layer 46 will be mainly described.

In the detection unit 2 of the third embodiment, the third insulating layer 45, the first shield layer 43, the first insulating layer 41, the first electrode layer 20, the insulating elastic body layer 10, the second electrode layer 30, the second insulating layer 42, the second shield layer 44, and the fourth insulating layer 46 are arranged in the order presented in the first normal direction ND1.

The first shield layer 43 and the second shield layer 44 are sheet-like conductors respectively overlapped on the whole surfaces of the first electrode layer 20 and the second electrode layer 30 when viewed in the first normal direction ND1. The first shield layer 43 and the second shield layer 44 are solid electrodes covering the first electrode layer 20 and the second electrode layer 30, respectively. The first insulating layer 41 insulates the first electrode layer 20 and the first shield layer 43, and the second insulating layer 42 insulates the second electrode layer 30 and the second shield layer 44.

As methods for forming the first shield layer 43 and the second shield layer 44, there are three methods which will be described later, for example. In the first method, the first shield layer 43 is formed on a base material, an insulating ink is printed or an insulating film is bonded to form the first insulating layer 41, and the first electrode layer 20 is formed thereon. Similarly, the second shield layer 44 is formed, an insulating ink is printed or an insulating film is bonded to form the second insulating layer 42, and the second electrode layer 30 is formed thereon.

In the second method, the first electrode layer 20 and the first shield layer 43 are formed on and bonded to respective surfaces of an insulating base material (the first insulating layer 41). Similarly, the second electrode layer 30 and the second shield layer 44 are formed on and bonded to respective surfaces of an insulating base material (the second insulating layer 42).

In the third method, the first shield layer 43 is printed on the third insulating layer 45, the first electrode layer 20 is printed on the first insulating layer 41, the second shield layer 44 is printed on the fourth insulating layer 46, and the second electrode layer 30 is printed on the second insulating layer 42, and they are bonded. In the first method, a wire for connection to the first shield layer 43 can be provided for the first electrode layer 20 via a through-hole, for example. In addition, a wire for connection to the second shield layer 44 can be provided for the second electrode layer 30 via a through-hole, for example. Furthermore, by connecting wires to the first electrode layer 20 and the second electrode layer 30 with a conductive adhesive, an anisotropic conductive paste (ACP), or an anisotropic conductive film (ACF), for example, wires for lead-out can be consolidated in one layer. In this case, the wires can be led out in a ZIF connector format having a high degree of freedom in design in a housing. A method for leading out the wires includes a method for swaging wires in each layer with a metal pin and directly leading out the wires without creating interlayer short-circuit points in four layers via through-holes or the like.

Fourth Embodiment

(8) Configuration of Shear Force Sensor 1 of Fourth Embodiment

Figure 15:
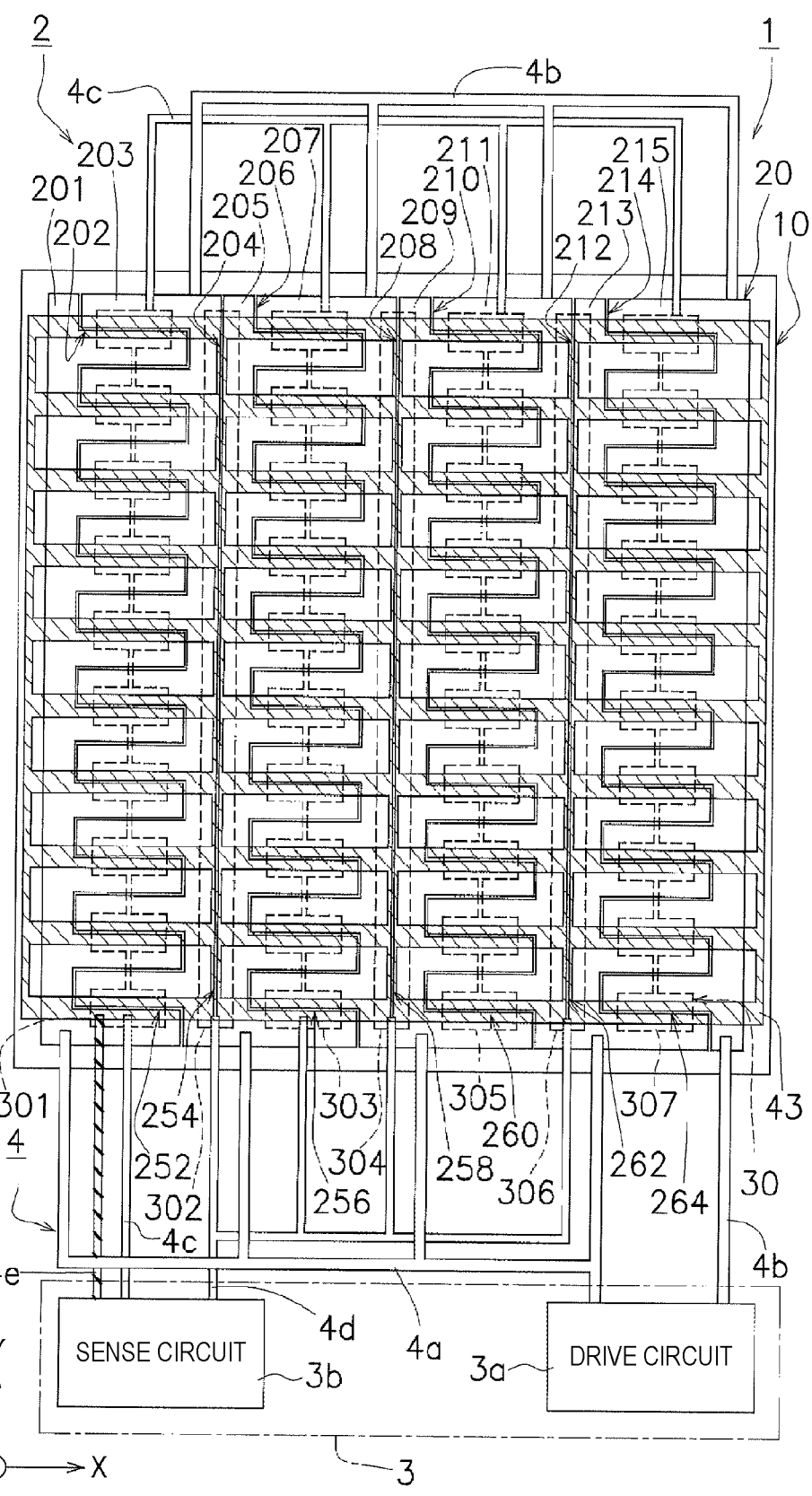
FIG. 15 is a schematic plan view showing an example of a pattern of a first shield layer, the first electrode layer, and the second electrode layer of a shear force sensor according to a fourth embodiment.

The shear force sensor 1 of a fourth embodiment has a planar shape shown in FIG. 15. The shear force sensor 1 of the fourth embodiment is combined with a touch sensor. The shear force sensor 1 of the fourth embodiment has the same sectional structure as the shear force sensor 1 of the third embodiment shown in FIG. 14.

The shear force sensor 1 of the fourth embodiment constitutes a capacitive touch sensor through use of the first shield layer 43. When functioning as the touch sensor, the sense circuit 3b detects a change in electric charge produced in the first shield layer 43 by the finger 90 of a person, for example. Thus, the sense circuit 3b is connected to the first shield layer 43 with a fifth wire 4e. When measuring a shear force, the sense circuit 3b connects the first shield layer 43 to the ground GND. When measuring a shear force, the first shield layer 43 exercises the noise reducing function as a shield by being connected to the ground GND.

The shear force sensor 1 of the fourth embodiment equipped with the touch sensor function enables detection of a contact not accompanied by shearing. For example, detection of the presence/absence of the pressing force PFz by the touch sensor function as a substitution eliminates the need to consider the sensitivity in the Z-direction (the first normal direction ND1), which can broaden choices of the material quality of the insulating elastic body for constituting the insulating elastic body layer 10. Then, the shear force sensor 1 can have a lower profile depending on selection of the material quality of the insulating elastic body.

Fifth Embodiment

(9) Configuration of Shear Force Sensor 1 of Fifth Embodiment

Figure 16:
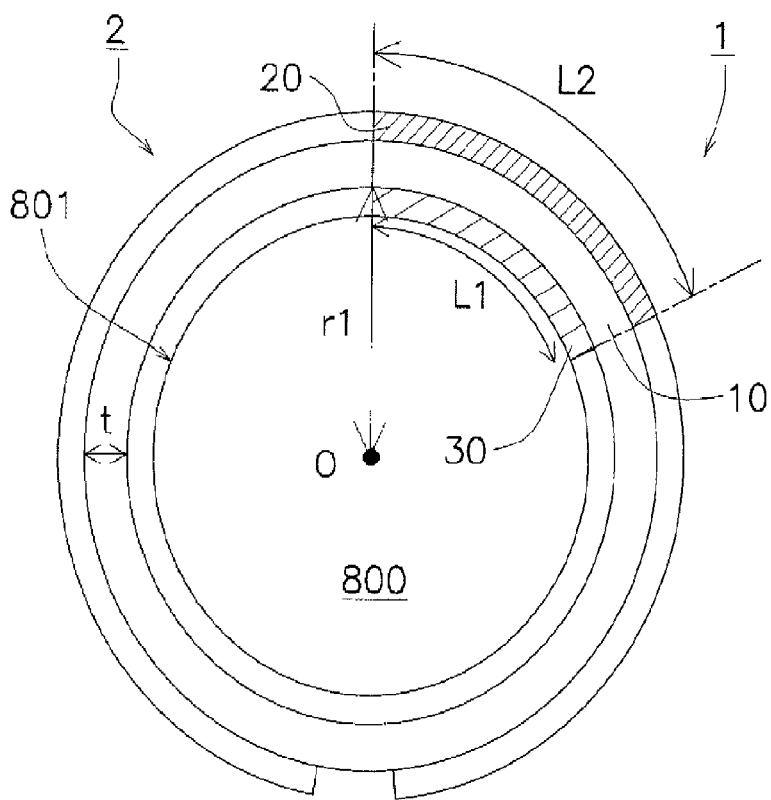
FIG. 16 is a schematic view for describing a pattern design in a case of fixing the shear force sensor along a curved surface.

The shear force sensor 1 of a fifth embodiment is a sensor that measures a shear force along a curved surface. The detection unit 2 bonded to a curved surface (a lateral surface 801) of a pillar 800 shown in FIG. 16, for example, has the second electrode layer 30, the insulating elastic body layer 10, and the first electrode layer 20. Assume that the second electrode layer 30 on the curved surface (the lateral surface 801) of the pillar 800 has a length L1. When a section vertical to a central axis O of the pillar 800 is viewed, the surface of the second electrode layer 30 traces an arc having a radius r1 around the central axis O of the pillar 800. In the detection unit 2 for the shear force sensor 1, the thickness t of the insulating elastic body layer 10 shall be sufficiently larger than the thicknesses of the second electrode layer 30 and the first electrode layer 20. In this case, unless the length L2 of the first electrode layer 20 corresponding to the length L1 of the second electrode layer 30 is longer than the length L1 of the second electrode layer 30 corresponding electrodes of both the electrode layers will be misaligned due to the thickness t of the insulating elastic body layer 10. Thus, a pattern of the length L2 of the first electrode layer 20 is enlarged by (1+t/r1) so as to correspond to a pattern of the second electrode layer 30 having the length L1 along the curved surface having the radius r1. Alternatively, the pattern of the length L1 of the second electrode layer 30 may be contracted by (1−t(r1+t)) with reference to the pattern of the length L2 of the first electrode layer 20.

Note that in the case of the pillar 800, enlargement of the pattern of the first electrode layer 20 with respect to the pattern of the second electrode layer 30 in the direction in which the central axis O of the pillar 800 extends does not occur. Thus, the first electrode layer 20 and the second electrode layer 30 are not enlarged/contracted in the direction in which the central axis O extends.

Sixth Embodiment

(10) Configuration of Shear Force Sensor 1 of Sixth Embodiment

Figure 17:
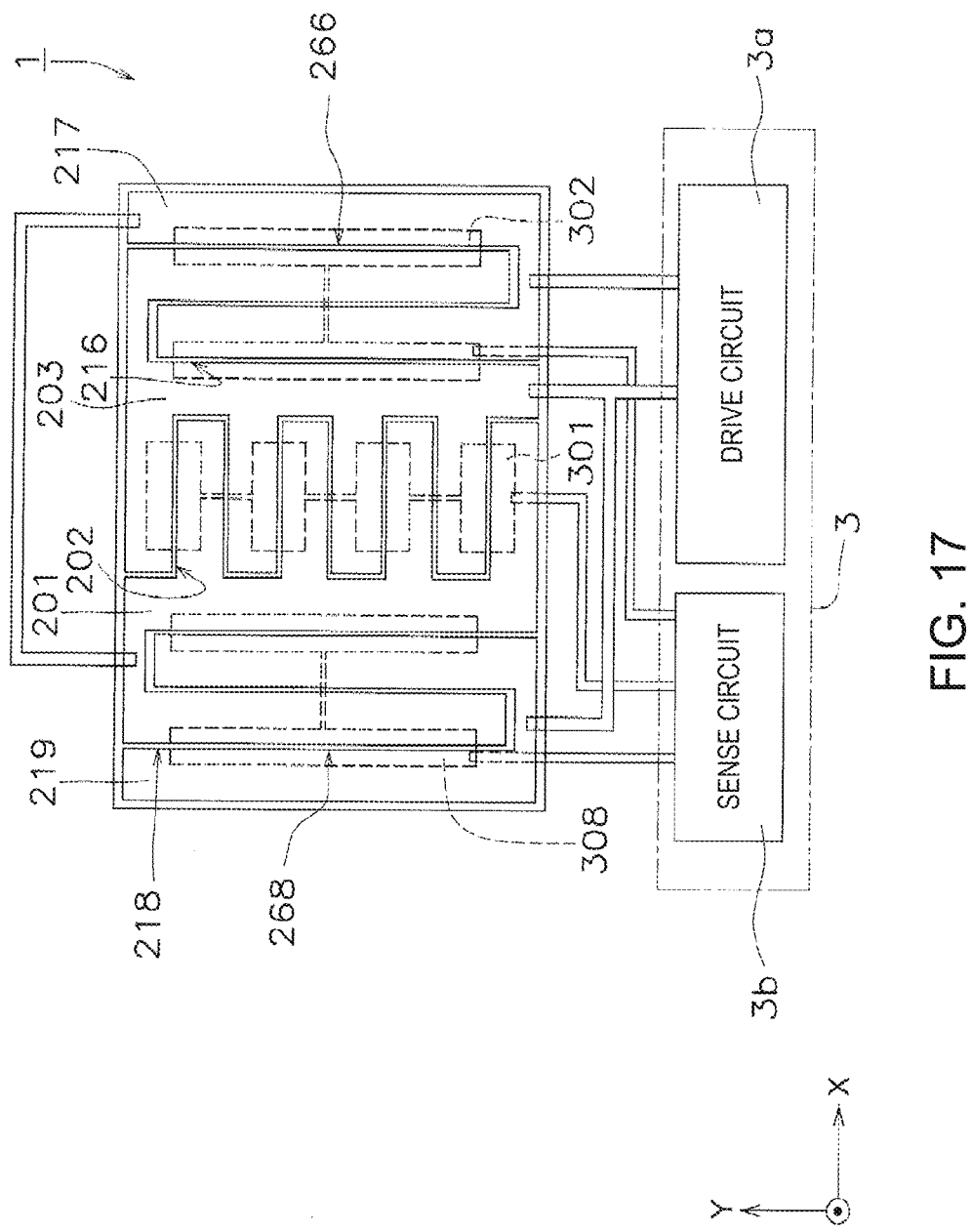
FIG. 17 is a schematic plan view showing an example of a pattern of the first electrode layer and the second electrode layer of a shear force sensor according to a sixth embodiment.

The shear force sensor 1 of a sixth embodiment is configured to be capable of measuring an in-plane distribution in the X-direction. For example, the shear force sensor 1 depicted in FIG. 17 is configured to be capable of measuring the in-plane distribution in the X-direction at two locations. The sense circuit 3*b* separately measures capacitances using two second detection electrodes 302 and 308, respectively.

The shear force sensor 1 of the sixth embodiment measures a shear force in the Y-direction with the first detection electrode 301, the first driving electrode 201, the second driving electrode 203, and the first isolation trench 202 similarly to the shear force sensor 1 of the first embodiment.

In the shear force sensor 1 of the sixth embodiment, a second isolation trench 216 that insulates and isolates the second driving electrode 203 also serving as the third driving electrode and a fourth driving electrode 217 also meanders. Similarly, a second isolation trench 218 that insulates and isolates a third driving electrode 219 and the first driving electrode 201 also serving as the fourth driving electrode also meanders. In this manner, not only the first isolation trench 202, but also the second isolation trenches 216 and 218 may be formed to meander. In the second isolation trenches 216 and 218, second portions 266 and 268 are respectively provided at a plurality of locations by changing their extending directions a plurality of times. The second detection electrodes 302 and 308 have shapes overlapped on the plurality of second portions 266 and 268 when viewed in the first normal direction ND1. In other words, the portions of the second detection electrodes 302 and 308 overlapped on the plurality of second portions 266 and 268 are connected in series.

Seventh Embodiment

(11) Configuration of Shear Force Sensor 1 of Seventh Embodiment

Figure 18:
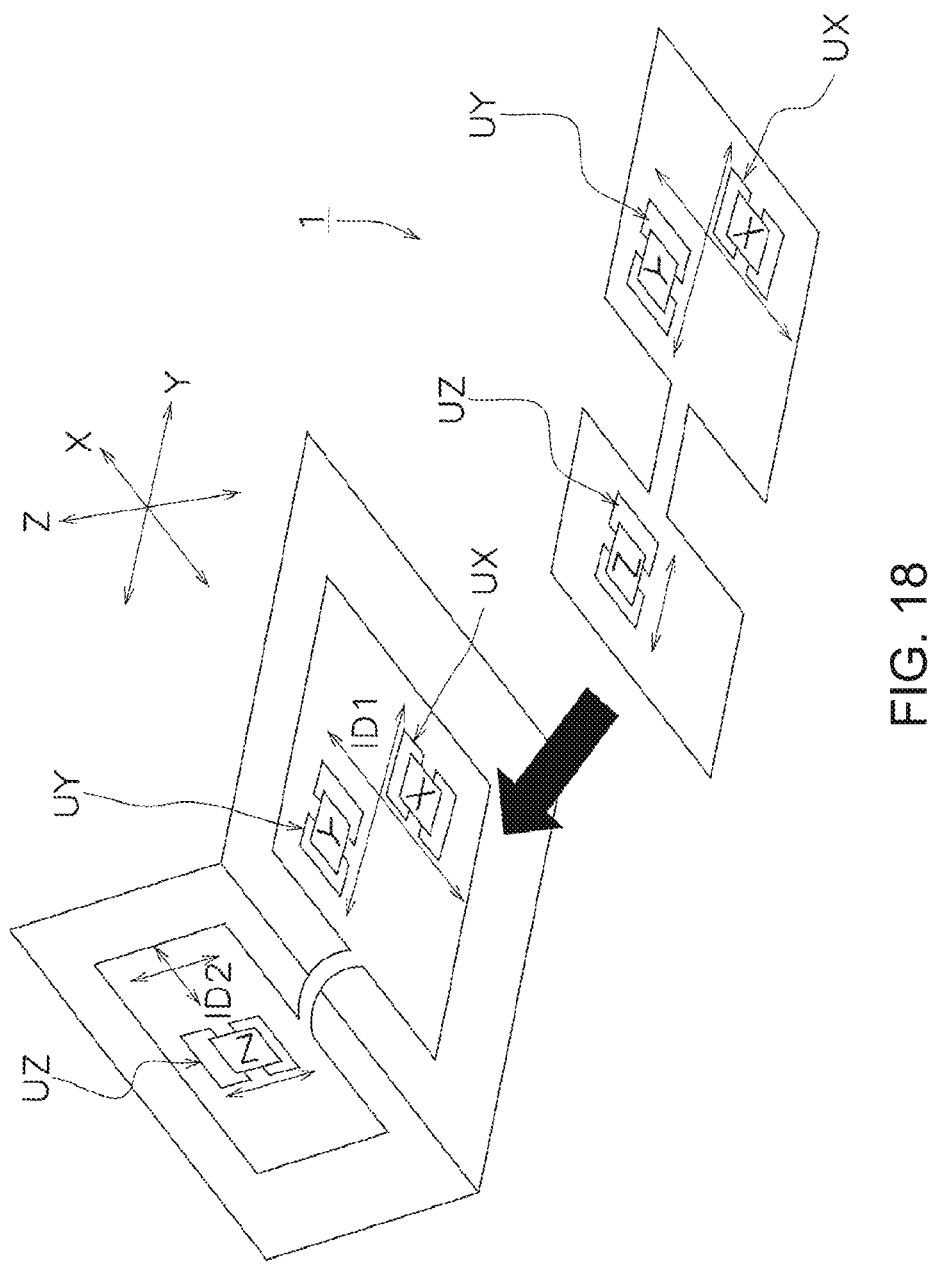
FIG. 18 is a schematic view for describing a configuration of a shear force sensor according to a seventh embodiment.

The shear force sensor 1 of a seventh embodiment can measure shear forces in the X-direction, the Y-direction, and the z-direction. The shear force sensor 1 of the seventh embodiment includes a Z unit cell UZ in addition to the X unit cell UX and the Y unit cell UY described with reference to FIG. 6 (see FIG. 18) so as to be configured such that a shear force in the Z-direction can also be measured. In addition, the first electrode layer 20, the second electrode layer 30, and the insulating elastic body layer 10 are bent at a location of a dash-double-dot line shown in FIG. 19.

By bending the insulating elastic body layer 10, the insulating elastic body layer 10 is elastically deformable not only in the first in-plane direction ID1 but also in a second in-plane direction ID2 different from the first in-plane direction ID1.

In the shear force sensor 1 of the seventh embodiment, in order to detect the shear force Fy in the Y-direction, the first driving electrode 201 and the second driving electrode 203 insulated from each other by the first isolation trench 202 as well as the first detection electrode 301 are formed. In addition, in order to detect the shear force Fx in the X-direction, the second driving electrode 203 also serving as the third driving electrode and the fourth driving electrode 217 insulated from each other by the second isolation trench 216 as well as the second detection electrode 302 are formed.

Furthermore, in order to detect a shear force Fz in the Z-direction, a fifth driving electrode 401 and a sixth driving electrode 403 insulated from each other by a third isolation trench 402 extending in the second in-plane direction ID2 (a direction parallel to the XZ-plane in FIG. 19) and spreading in the second in-plane direction ID2 are formed in the first electrode layer 20. The third isolation trench 402 has a third portion 452 extending in a third direction (the X-direction) in the second in-plane direction ID2. A third detection electrode 501 overlapped on the fifth driving electrode 401, the third portion 452 of the third isolation trench 402, and the sixth driving electrode 403 when viewed in a second normal direction ND2 (the Y-direction in FIG. 19) perpendicular to the second in-plane direction ID2 are formed in the second electrode layer 30. Note that in FIG. 19, the first normal direction ND1 is the Z-direction.

Figure 19:
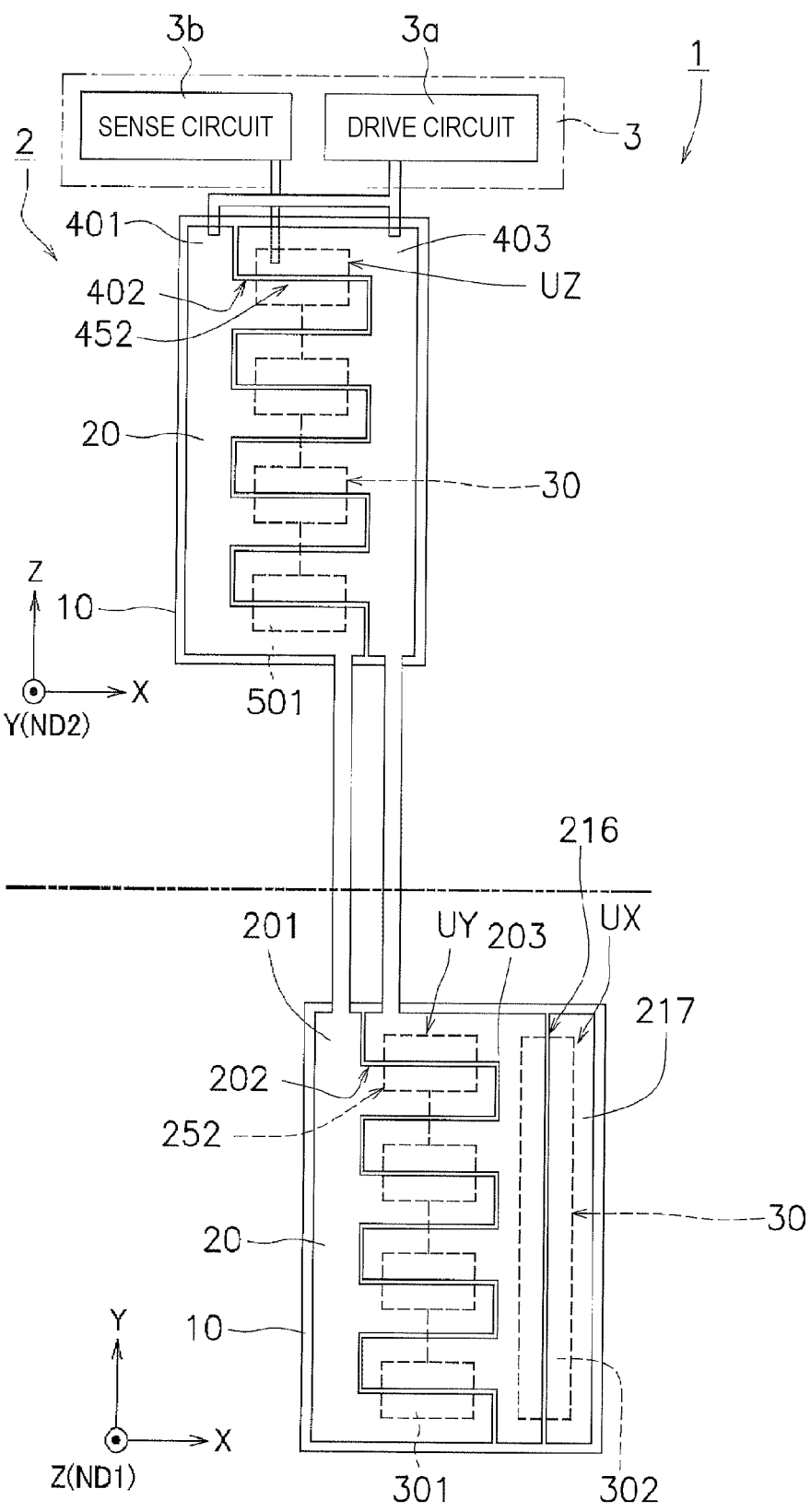
FIG. 19 is a schematic plan view showing an example of a pattern of the first electrode layer and the second electrode layer of the shear force sensor according to the seventh embodiment.

The detection circuit 3 detects the third shear force Fz exerted in a third shear direction (the Z-direction in FIG. 19) perpendicular to the third direction in the second in-plane direction ID2 based on a change in a fifth capacitance (a change from Cz1*c* to Cz1) produced between the fifth driving electrode 401 and the third detection electrode 501 and a change in a sixth capacitance (a change from Cz2*c* to Cz2) produced between the sixth driving electrode 403 and the third detection electrode 501. The capacitances Cz1*c* and Cz2*c* are capacitances obtained by calibration, and the capacitances Cz1 and Cz2 are capacitances obtained when the shear force Fz is exerted. Note that in FIG. 19, depiction of wires for detection in the X-direction and the Y-direction performed by the detection circuit 3 is omitted.

The detection circuit 3 calculates the shear force Fz from the measured capacitances Cz1*c*, Cz2*c*, Cz1, and Cz2.

The detection circuit 3 calculates the shear force Fz in the Z-direction by Equation (4) below. However, Kz is a constant.

$$Fz = Kz \cdot \{Cz1/(Cz1 + Cz2) - Cz1c/(Cz1c + Cz2c)\} \qquad (4)$$

As described above, if there are three detection electrodes of the first detection electrodes 301, the second detection electrode 302, and the third detection electrode 501, the first driving electrode 201, and the second driving electrode 203 in a three-dimensional structural body, capacitances can be detected, and shear forces in three axis directions of the X-axis direction, the Y-axis direction, and the Z-axis direction can be detected. In that case, the first driving electrode 201 also serves as the fourth driving electrode 217 and the fifth driving electrode 401 described above, and the second driving electrode 203 also serves as the sixth driving electrode 403.

In the description of the above seventh embodiment the case of measuring the shear forces Fx, Fy, and Fz has been described. However, the pressing force PFz in the first normal direction ND1 perpendicular to the first in-plane direction ID1 and a pressing force PFy in the second normal direction ND2 perpendicular to the second in-plane direction ID2 can also be measured by using the pattern of the first electrode layer 20 and the second electrode layer 30 shown in the seventh embodiment. The pressing force PFz can be calculated by Equation (3) described in the second embodiment.

In addition, the detection circuit 3 calculates the pressing force PFy in the Y-direction by Equation (5) below. However, PKy is a constant.

$$PFy = PKy \cdot \{(Cz1 + Cz2)/(Cz1c + Cz2c) - 1\} \qquad (5)$$

Furthermore, the detection circuit 3 can also be configured to be capable of detecting a shear force in the X-direction in the second in-plane direction ID2. For example, the detection circuit 3 can be configured to detect the shear forces Fx1 and Fy in the X-direction and the Y-direction and the pressing force PFz in the first normal direction ND1 with a single X unit cell UX and a single Y unit cell UY arranged in the first in-plane direction ID1, and to detect the shear forces Fx2 and Fz in the Z-direction and the X-direction with the Z unit cell UZ and another X unit cell UX arranged in the second in-plane direction ID2. In addition, the detection circuit 3 can be configured to detect the pressing force PFz in the Z-direction and the pressing force PFy in the Y-direction with these four unit cells.

Eighth Embodiment

(12) Configuration of Shear Force Sensor 1 of Eighth Embodiment

Figure 20:
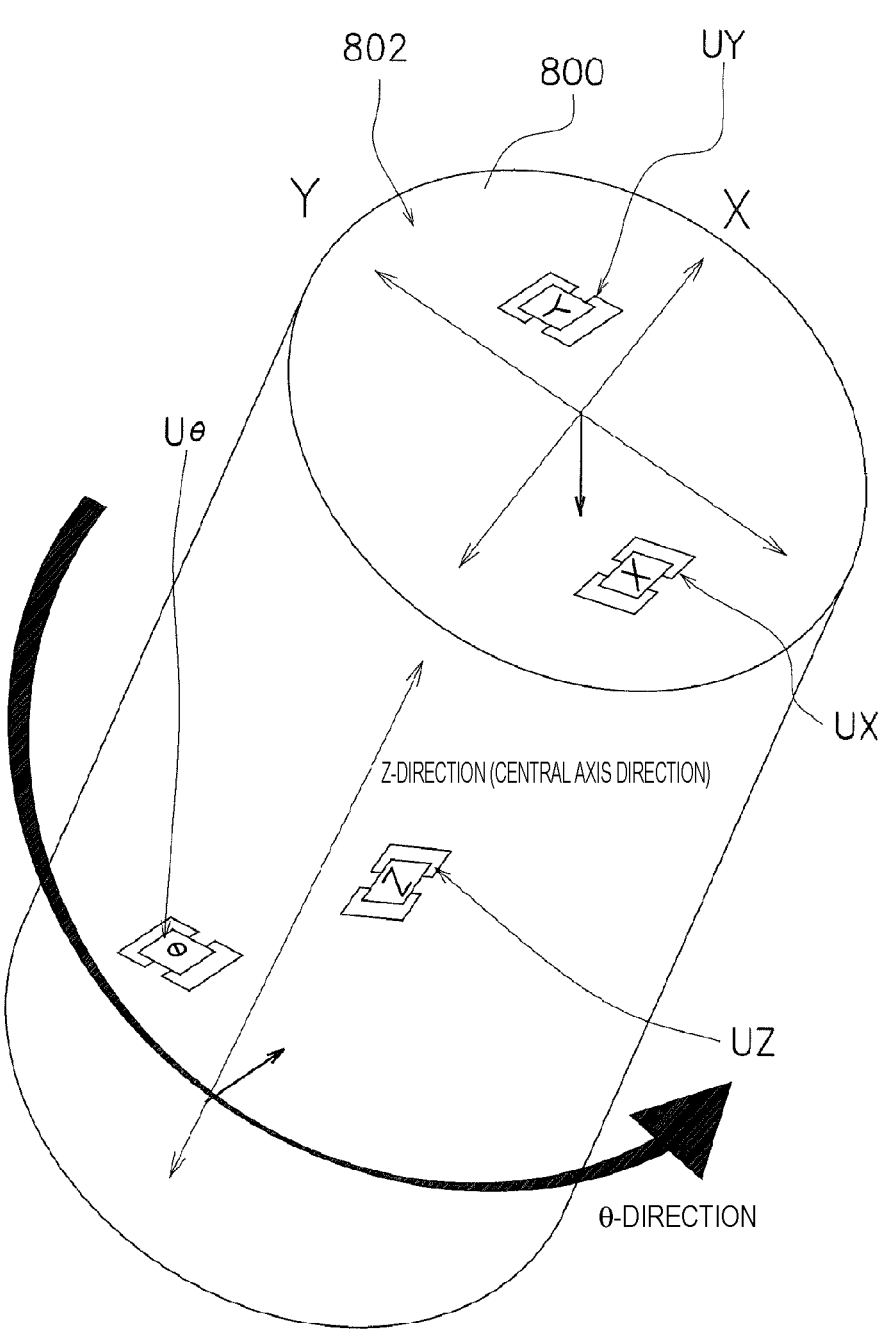
FIG. 20 is a schematic perspective view for describing a shear force sensor applied to a pillar according to an eighth embodiment.

In a case of bending the shear force sensor 1 having the planar detection unit 2 to be bonded and fixed to the pillar 800 shown in FIG. 20 similarly to the seventh embodiment, measurement in four directions of the central axis direction of the pillar 800, a rotation direction, and the X-direction and the Y-direction of a bottom surface (or six directions including a pressing force on each surface) can be performed by designing unit cells to be arranged on the lateral surface 801 and a bottom surface 802. For example, the X unit cell UX and the Y unit cell UY are arranged on the bottom surface 802, and the Z unit cell UZ and a θ unit cell Uθ are arranged on the lateral surface 801.

(13) Characteristics (13-1)

In the shear force sensor 1 described above, the detection unit 2 that detects a shear force in the first shear direction and the second shear direction can be configured by the two electrode layers of the first electrode layer 20 and the second electrode layer 30 that sandwich the insulating elastic body layer 10. In other words, an insulating elastic body layer, an electrode layer for a driving electrode, and an electrode layer for a detection electrode, a plurality of sets of which have conventionally been required, can be consolidated in one set. As a result, the detection unit for the shear force sensor can be made thin. In addition, two shear forces in the first shear direction and the second shear direction can be detected in a relatively wide region of the two electrode layers of the first electrode layer 20 and the second electrode layer 30, and a material having relatively small stretchability can also be used as the material of the insulating elastic body layer. Thus, a material having relatively high durability can be selected as the material of the insulating elastic body, and a durable shear force sensor can be provided.

In addition, since both the first detection electrode Ry and the second detection electrode Rx can detect shear forces by elastic deformation of the insulating elastic body layer 10 which is an identical layer, an error of measurement of shear forces can be reduced as compared with a case in which the first detection electrode Ry and the second detection electrode Rx respectively use elastic deformation of insulating elastic bodies of different layers.

(13-2)

In the shear force sensor 1 shown in FIG. 2, the second driving electrodes also serve as the third driving electrodes. The shear force sensor 1 configured in this manner has a reduced number of driving electrodes by the three second driving electrodes 203, 207, and 211 also serving as the three third driving electrodes. As a result, the area of the detection unit 2 for the shear force sensor 1 can be reduced to downsize the shear force sensor 1. In addition, the first driving electrodes also serve as the fourth driving electrodes. The shear force sensor 1 configured in this manner has a reduced number of driving electrodes by the three first driving electrodes 205, 209, and 213 also serving as the three fourth driving electrodes. Control of the driving electrodes can be simplified by the second electrodes also serving as the third driving electrodes and the first driving electrodes also serving as the fourth driving electrodes.

(13-3)

In the shear force sensor 1 shown in FIG. 2, the first portions 252, 256, 260, and 264 are respectively provided at a plurality of locations by meandering the first isolation trenches 202, 206, 210, and 214 to change the direction in which the first isolation trenches 202, 206, 210, and 214 extend a plurality of times. Then, the first detection electrodes 301, 303, 305, and 307 respectively have shapes overlapped on the plurality of first portions 252, 256, 260, and 264. In other words, portions of the first detection electrodes 301, 303, 305, and 307 overlapped on the plurality of first portions 252, 256, 260, and 264 are connected in series. As a result, it is easier to increase the total length of the first portions 252, 256, 260, and 264 than in a case in which the first isolation trenches are linear, which enables the sensitivity of the shear force sensor 1 to be improved easily. In FIG. 2, for example, the total length of the first portions 252, 256, 260, and 264 is longer than the length of one side of the detection unit 2.

(13-4)

The shear force sensor 1 shown in FIG. 2 is provided with four sets of the first driving electrode 201, 205, 209, or 213, the first isolation trench 202, 206, 210, or 214, the second driving electrode 203, 207, 211, or 215, and the first detection electrode 301, 303, 305, or 307. In the case in which a plurality of sets of the first driving electrode, the first isolation trench, the second driving electrode, and the first detection electrode are provided in this manner, it is easier to increase the total area of the first detection electrodes 301, 303, 305, and 307 than in a case in which only one set of the first driving electrode, the first isolation trench, the second driving electrode, and the first detection electrode is provided, which enables the sensitivity of the shear force sensor 1 to be improved easily.

(13-5)

In the shear force sensor 1 of the second embodiment, the insulating elastic body layer 10 is elastically deformable in the first normal direction ND1. As shown in Equation (3), the detection circuit 3 is configured to detect the pressing force PFz in the first normal direction ND1 based on changes in the first capacitance, the second capacitance, the third capacitance, and the fourth capacitance, so that not only the shear forces Fx and Fy but also the pressing force PFz can be detected.

(13-6)

The shear force sensor 1 of the third embodiment reduces an influence caused by an electric field on the first electrode layer 20 or the second electrode layer 30 by virtue of the first shield layer 43 and the second shield layer 44 shown in FIG. 14, thus reducing an influence caused by noise.

(13-7)

The shear force sensor 1 of the fourth embodiment includes the first shield layer 43 that functions as a touch sensor overlapped on the first electrode layer 20 in the first normal direction ND1. Since the detection circuit 3 is configured to be capable of detecting a contact made by the first shield layer 43 (the touch sensor), a contact with the shear force sensor 1 can be recognized even in a case in which a shear force cannot be detected.

(13-8)

Figure 13:
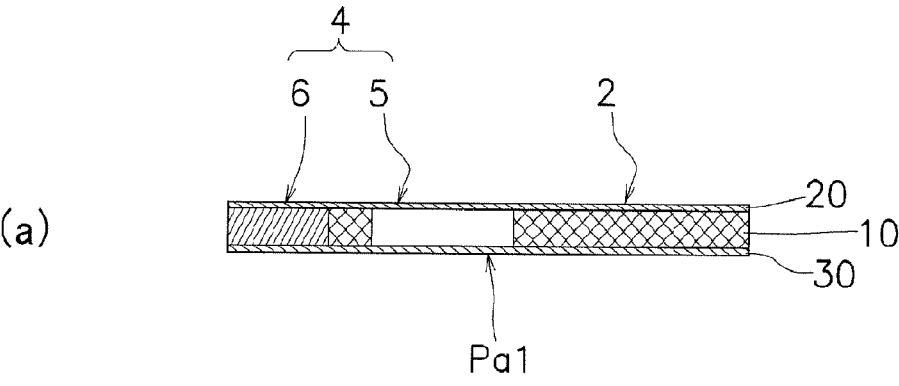
FIG. 13 includes schematic sectional views showing another example of the sectional shape of the wiring part.
Figure 13:
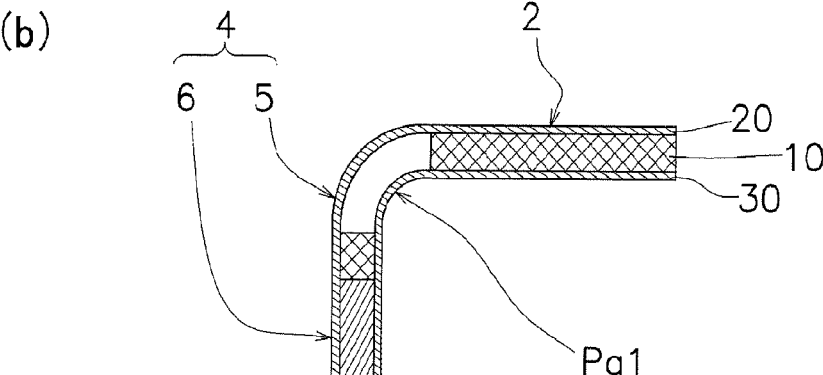

The shear force sensor 1 described above includes the wiring part 4 that connects the detection circuit 3 to the first electrode layer 20 and the second electrode layer 30 of the detection unit 2 as shown in FIG. 11, FIG. 12, and FIG. 13. The wiring part 4 has the flexible portion 5 to be deformed more easily than the detection unit 2 including the first electrode layer 20 and the second electrode layer 30 as well as the insulating elastic body layer 10. The shear force sensor 1 having the flexible portion 5 can reduce an error occurring in detection of shear forces by virtue of deformation of the flexible portion 5.

(13-9)

The shear force sensors 1 of the seventh embodiment and the eighth embodiment can detect the third shear force Fz in the second in-plane direction ID2 different from the first in-plane direction ID1 in which the first shear force Fx and the second shear force Fy are occurring.

(14) Modifications (14-1) Modification A

In a case in which the shear force sensor 1 described above is not equipped with the touch sensor function, either the first electrode layer 20 or the second electrode layer 30 may be arranged on an operation surface. In other words, in the case in which the shear force sensor 1 described above is not equipped with the touch sensor function, it is an arbitral selection which of the first electrode layer 20 and the second electrode layer 30 is a layer to which a shear force is applied and which of them is a layer to be fixed.

Although one embodiment of the present invention has been described above, the present invention is not limited to the above-described embodiment, but can be changed variously within a range not departing from the spirit of the invention. In particular, any combination of a plurality of embodiments and modifications written in the present specification may be possible as necessary.

REFERENCE SIGNS LIST 1 shear force sensor
2 detection unit 3 detection circuit
4 wiring part
5 flexible portion
10 insulating elastic body layer
20 first electrode layer
30 second electrode layer
43 first shield layer
44 second shield layer
201, 205, 209, 213 first driving electrode
202, 206, 210, 214 first isolation trench
203, 207, 211, 215 second driving electrode
204, 208, 212, 216 second isolation trench
252, 256, 260, 264 first portion
301, 303, 305, 307 first detection electrode
302, 304, 306, 308 second detection electrode

The invention claimed is:

1. A shear force sensor comprising:

a first electrode layer and a second electrode layer opposite to each other;

an insulating elastic body layer that is located between the first electrode layer and the second electrode layer to electrically insulate both the electrode layers and is elastically deformable in a first in-plane direction of the first electrode layer; and a detection circuit connected to the first electrode layer and the second electrode layer, wherein:

a first driving electrode and a second driving electrode insulated from each other by a first isolation trench are formed in the first electrode layer, a third driving electrode and a fourth driving electrode insulated from each other by a second isolation trench are formed in the first electrode layer, the first isolation trench has a first portion extending in a first direction in the first in- plane direction, and the second isolation trench has a second portion extending in a second direction in the first in-plane direction, the first direction and the second direction being directions crossing each other, a first detection electrode overlapped on the first driving electrode, the first portion of the first isolation trench, and the second driving electrode when viewed in a first normal direction perpendicular to the first in-plane direction is formed in the second electrode layer, a second detection electrode overlapped on the third driving electrode, the second portion of the second isolation trench, and the fourth driving electrode when viewed in the first normal direction is formed in the second electrode layer, and wherein the detection circuit detects a first shear force exerted in a first shear direction perpendicular to the first direction in the first in-plane direction based on a change in a first capacitance produced between the first driving electrode and the first detection electrode and a change in a second capacitance produced between the second driving electrode and the first detection electrode, and detects a second shear force exerted in a second shear direction perpendicular to the second direction in the first in-plane direction based on a change in a third capacitance produced between the third driving electrode and the second detection electrode and a change in a fourth capacitance produced between the fourth driving electrode and the second detection electrode.

2. The shear force sensor according to claim 1, wherein the second driving electrode also serves as the third driving electrode.

3. The shear force sensor according to claim 1, wherein the first portion is provided at a plurality of locations by changing a direction in which the first isolation trench extends a plurality of times, and the first detection electrode has a shape overlapped on the first portion at the plurality of locations when viewed in the first normal direction.

4. The shear force sensor according to claim 1, wherein a plurality of sets of the first driving electrode, the first isolation trench, the second driving electrode, and the first detection electrode are provided.

5. The shear force sensor according to claim 1, wherein the insulating elastic body layer is elastically deformable in the first normal direction, and the detection circuit detects a pressing force in the first normal direction based on changes in the first capacitance, the second capacitance, the third capacitance, and the fourth capacitance.

6. The shear force sensor according to claim 1, further comprising a first insulating layer, a first shield layer, a second insulating layer, and a second shield layer, wherein the first shield layer, the first insulating layer, the first electrode layer, the insulating elastic body layer, the second electrode layer, the second insulating layer, and the second shield layer are arranged in an order presented in the first normal direction, the first shield layer and the second shield layer are made of sheet-like conductors respectively overlapped on whole surfaces of the first electrode layer and the second electrode layer when viewed in the first normal direction, and the first insulating layer insulates the first electrode layer and the first shield layer, and the second insulating layer insulates the second electrode layer and the second shield layer.

7. The shear force sensor according to claim 1, further comprising a touch sensor overlapped on the first electrode layer in the first normal direction, wherein the detection circuit is configured to detect a contact made by the touch sensor.

8. The shear force sensor according to claim 1, further comprising a wiring part that connects the detection circuit to the first electrode layer and the second electrode layer, wherein the wiring part has a flexible portion that is easier to deform than a detection unit including the first electrode layer, the second electrode layer, and the insulating elastic body layer.

9. The shear force sensor according to claim 1, wherein the first electrode layer, the second electrode layer, and the insulating elastic body layer are bent, the insulating elastic body layer is elastically deformable also in a second in-plane direction different from the first in-plane direction, a fifth driving electrode and a sixth driving electrode insulated from each other by a third isolation trench extending in the second in-plane direction and spreading in the second in-plane direction are formed in the first electrode layer, the third isolation trench has a third portion extending in a third direction in the second in-plane direction, a third detection electrode overlapped on the fifth driving electrode, the third portion of the third isolation trench, and the sixth driving electrode when viewed in a second normal direction perpendicular to the second in-plane direction is formed in the second electrode layer, and the detection circuit detects a third shear force exerted in a third shear direction perpendicular to the third direction in the second in-plane direction based on a change in a fifth capacitance produced between the fifth driving electrode and the third detection electrode and a change in a sixth capacitance produced between the sixth driving electrode and the third detection electrode.

10. A detection unit for a shear force sensor, comprising:

a first electrode layer and a second electrode layer opposite to each other; and an insulating elastic body layer that is located between the first electrode layer and the second electrode layer to electrically insulate both the first and the second electrode layers and is elastically deformable in a first in-plane direction of the first electrode layer, wherein a first driving electrode and a second driving electrode insulated from each other by a first isolation trench are formed in the first electrode layer, a third driving electrode and a fourth driving electrode insulated from each other by a second isolation trench are formed in the first electrode layer, the first isolation trench has a first portion extending in a first direction in the first in-plane direction, and the second isolation trench has a second portion extending in a second direction in the first in-plane direction, the first direction and the second direction being directions crossing each other, a first detection electrode overlapped on the first driving electrode, the first portion of the first isolation trench, and the second driving electrode when viewed in a first normal direction perpendicular to the first in-plane direction is formed in the second electrode layer, and a second detection electrode overlapped on the third driving electrode, the second portion of the second isolation trench, and the fourth driving electrode when viewed in the first normal direction is formed in the second electrode layer.

11. The detection unit of claim 10, wherein the detection unit is configured to detect a first shear force exerted in a first shear direction perpendicular to the first direction in the first in-plane direction based on a change in a first capacitance produced between the first driving electrode and the first detection electrode and a change in a second capacitance produced between the second driving electrode and the first detection electrode, and detect a second shear force exerted in a second shear direction perpendicular to the second direction in the first in-plane direction based on a change in a third capacitance produced between the third driving electrode and the second detection electrode and a change in a fourth capacitance produced between the fourth driving electrode and the second detection electrode.

12. The detection unit according to claim 10, further comprising a touch sensor overlapped on the first electrode layer in the first normal direction, wherein the detection unit is configured to be capable of detecting a contact made by the touch sensor.

13. The detection unit according to claim 10, further comprising a first shield layer and a second shield layer, wherein the first shield layer, the first insulating layer, the first electrode layer, the insulating elastic body layer, the second electrode layer, the second insulating layer, and the second shield layer are arranged in an order presented in the first normal direction, the first shield layer and the second shield layer are made of sheet-like conductors respectively overlapped on whole surfaces of the first electrode layer and the second electrode layer when viewed in the first normal direction, and the first insulating layer insulates the first electrode layer and the first shield layer, and the second insulating layer insulates the second electrode layer and the second shield layer.

14. The detection unit according to claim 10, further comprising a wiring part that connects the first detection electrode and the second detection electrode to the first electrode layer and the second electrode layer, wherein the wiring part has a flexible portion that is easier to deform than a whole structure including the first electrode layer, the second electrode layer, and the insulating elastic body layer.

15. The detection unit according to claim 10, wherein the first electrode layer, the second electrode layer, and the insulating elastic body layer are bent, the insulating elastic body layer is elastically deformable also in a second in-plane direction different from the first in-plane direction, a fifth driving electrode and a sixth driving electrode insulated from each other by a third isolation trench extending in the second in-plane direction and spreading in the second in-plane direction are formed in the first electrode layer, the third isolation trench has a third portion extending in a third direction in the second in-plane direction, a third detection electrode overlapped on the fifth driving electrode, the third portion of the third isolation trench, and the sixth driving electrode when viewed in a second normal direction perpendicular to the second in-plane direction is formed in the second electrode layer, and the detection circuit detects a third shear force exerted in a third shear direction perpendicular to the third direction in the second in-plane direction based on a change in a fifth capacitance produced between the fifth driving electrode and the third detection electrode and a change in a sixth capacitance produced between the sixth driving electrode and the third detection electrode.

16. The shear force sensor according to claim 1, wherein the detection circuit detects the first and second shear force changes at the time when an AC voltage is applying to the first driving electrode and the second driving electrode, and wherein the AC voltage is applying to the first driving electrode and the second driving electrode at different timings.

17. The shear force sensor according to claim 10, wherein the detection circuit detects the first and second shear force changes at the time when an AC voltage is applying to the first driving electrode and the second driving electrode, and wherein the AC voltage is applying to the first driving electrode and the second driving electrode at different timings.

18. The force sensor according to claim 1, wherein the first electrode layer, the second electrode layer, and the insulating layer are alternately bonded to a curve surface so that a shear force along the curved surface can be measured.

19. A method for measuring a shear force sensed by the shear force sensor of claim 1, the method comprising:

applying an AC voltage to the first driving electrode and the second driving electrode at different timing;

measuring a change in a first capacitance produced between the first driving electrode and the first detection electrode and a change in a second capacitance produced between the second driving electrode and the first detection electrode;

calculating a first shear force exerted in a first shear direction perpendicular to the first direction in the first in-plane direction based on the measured change in the first capacitance and the second capacitance;

measuring a change in a third capacitance produced between the third driving electrode and the second detection electrode and a change in a fourth capacitance produced between the fourth driving electrode and the second detection electrode at the time the AC voltage is applied to the third and fourth driving electrode; and calculating a second shear force exerted in a second shear direction perpendicular to the second direction in the first in-plane direction based on the measured change in the third capacitance and the fourth capacitance.

20. The method according to claim 19, further comprising measuring a change in a fifth capacitance produced between a fifth driving electrode and a third detection electrode and a change in a sixth capacitance produced between a sixth driving electrode and a third detection electrode; and calculating a third shear force exerted in a third shear direction perpendicular to a third direction in a second in-plane direction.

* * * * *